US011533010B2

(12) United States Patent
Henes

(10) Patent No.: US 11,533,010 B2
(45) Date of Patent: Dec. 20, 2022

(54) TORQUE CURRENT LIMITING VECTOR CONTROL SYSTEM AND METHOD FOR WINDOW REGULATOR BRUSHLESS MOTOR

(71) Applicant: MAGNA CLOSURES INC., Newmarket (CA)

(72) Inventor: Arthur J. W. Henes, Etobicoke (CA)

(73) Assignee: MAGNA CLOSURES INC., Newmarket (CA)

( * ) Notice: Subject to any disclaimer, the term of this patent is extended or adjusted under 35 U.S.C. 154(b) by 684 days.

(21) Appl. No.: 16/518,137

(22) Filed: Jul. 22, 2019

(65) Prior Publication Data

US 2020/0031207 A1     Jan. 30, 2020

Related U.S. Application Data

(60) Provisional application No. 62/702,496, filed on Jul. 24, 2018.

(51) Int. Cl.
| | |
|---|---|
| *H02P 21/04* | (2006.01) |
| *H02P 21/24* | (2016.01) |
| *E05F 15/41* | (2015.01) |
| *E05F 15/77* | (2015.01) |
| *E05F 15/695* | (2015.01) |

(Continued)

(52) U.S. Cl.
CPC ............. *H02P 21/04* (2013.01); *E05F 15/41* (2015.01); *E05F 15/695* (2015.01); *E05F 15/697* (2015.01); *E05F 15/77* (2015.01); *H02P 21/22* (2016.02); *H02P 21/24* (2016.02); *H02P 21/36* (2016.02); *B60J 1/004* (2013.01);
(Continued)

(58) Field of Classification Search
CPC .................................. B60J 1/17; H02P 21/24
USPC ......................................... 701/49; 318/3, 34
See application file for complete search history.

(56) References Cited

U.S. PATENT DOCUMENTS

| | | | | |
|---|---|---|---|---|
| 6,806,664 B2* | 10/2004 | Beishline | ............. | H02H 7/0851 |
| | | | | 318/461 |
| 8,541,969 B2* | 9/2013 | Holzinger | ............ | G05B 19/416 |
| | | | | 318/599 |

(Continued)

FOREIGN PATENT DOCUMENTS

| | | |
|---|---|---|
| CN | 207934682 U | 10/2018 |
| WO | 2007084289 A2 | 7/2007 |
| WO | 2019056072 A1 | 3/2019 |

*Primary Examiner* — David Luo
(74) *Attorney, Agent, or Firm* — Dickinson Wright PLLC

(57) ABSTRACT

A motor control system for controlling a brushless electric motor of a power operated actuator of a closure panel of a vehicle and method of operating the control system are provided. The control system includes a vector control system configured to receive a torque current based on a measured angular velocity of the motor and current of each of the phases and determine corresponding stationary reference frame voltages. The vector control system outputs pulse width modulation signals to the motor. A vector torque current limiter couples to the vector control system and the motor and is configured to determine the torque current drawn, receive the measured angular velocity and determine whether there is a reduction of the measured angular velocity and detects a pinch event and reduces the torque current in response to determining there is a reduction of the measured angular velocity of the brushless electric motor.

17 Claims, 16 Drawing Sheets

(51) Int. Cl.
*E05F 15/697* (2015.01)
*H02P 21/22* (2016.01)
*H02P 21/36* (2016.01)
*B60J 1/17* (2006.01)
*B60J 1/00* (2006.01)

(52) U.S. Cl.
CPC .............. *B60J 1/17* (2013.01); *E05Y 2400/36* (2013.01); *E05Y 2900/55* (2013.01)

(56) References Cited

U.S. PATENT DOCUMENTS

| | | | |
|---|---|---|---|
| 9,369,073 B1 * | 6/2016 | Tian | H02P 6/181 |
| 9,876,451 B2 * | 1/2018 | Bartalucci | H02P 6/16 |
| 2017/0089115 A1 | 3/2017 | Wang et al. | |

* cited by examiner

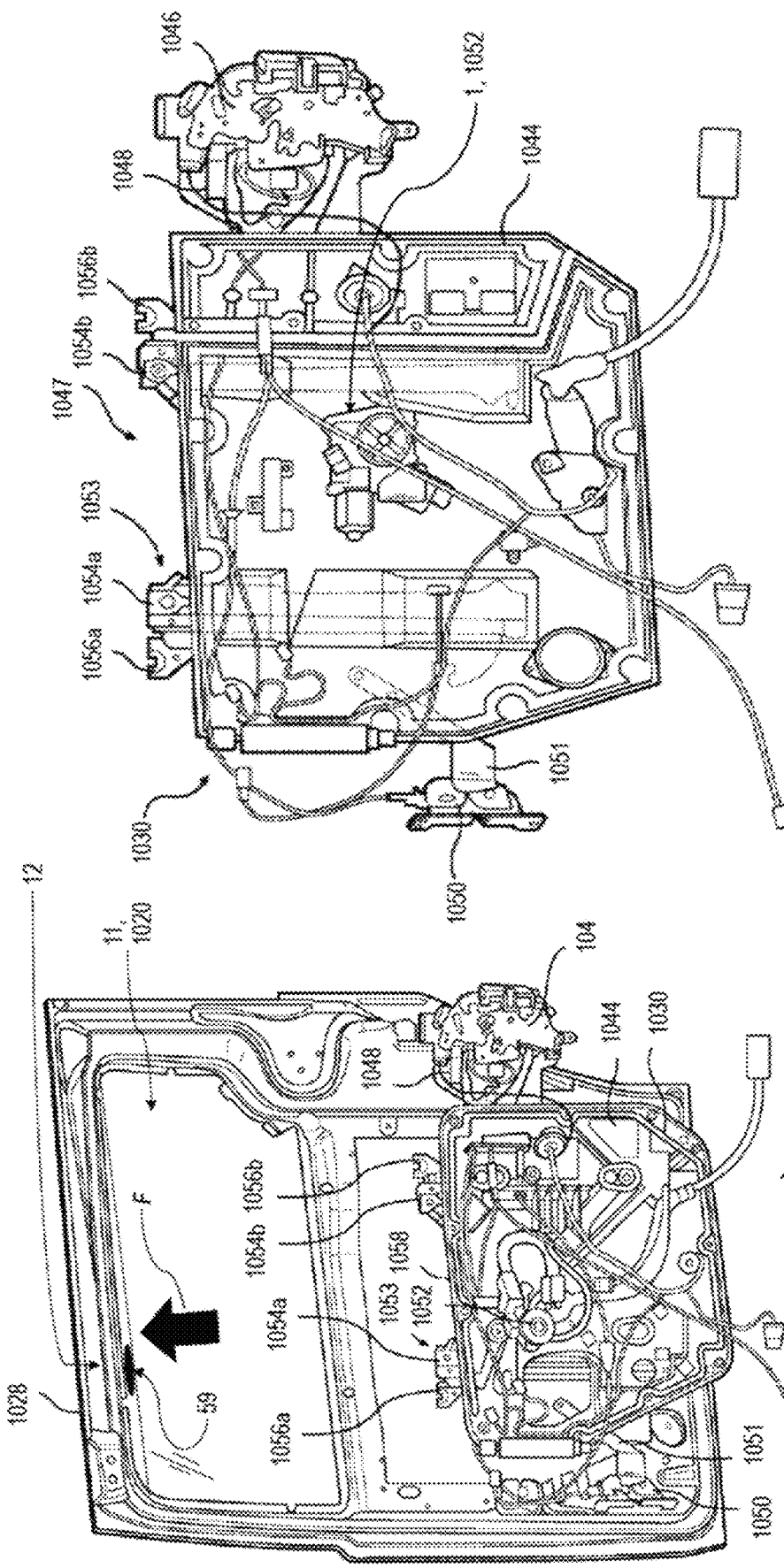

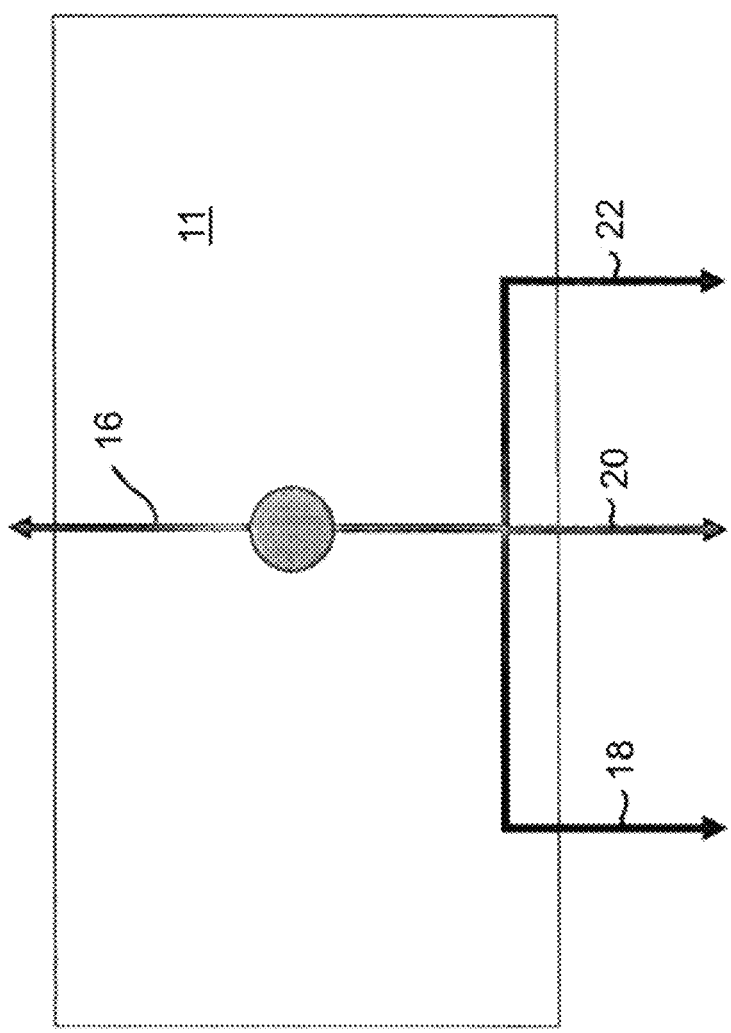

TORQUE CURRENT LIMITING VECTOR CONTROL SYSTEM AND METHOD FOR WINDOW REGULATOR BRUSHLESS MOTOR

CROSS-REFERENCE TO RELATED APPLICATIONS

This utility application claims the benefit of U.S. Provisional Application No. 62/702,496 filed Jul. 24, 2018. The entire disclosure of the above application is incorporated herein by reference.

FIELD

The present disclosure relates generally to a motor control system for an automotive power operated actuator and, more particularly to a torque current limiting vector control system for a brushless motor used in the power operated actuator. The present disclosure also relates to a method of operating the control system.

BACKGROUND

This section provides background information related to the present disclosure which is not necessarily prior art.

Window regulators and other power operated actuators are commonly found on motor vehicles. Such power operated actuators may be designed to meet stringent safety requirements and standards to ensure the safety of operators of the actuators. For example, one such safety standard is the Federal Motor Vehicle Safety Standards (FMVSS) standard number 118 or simply FMVSS118, which sets forth requirements for power operated window regulators along with other power operated closure members or panels. For example, FMVSS118 includes standards for automatic reversal systems in section five (S5) that require window regulator mechanisms to stop and reverse direction when they encounter obstacles (e.g., a person's finger, arm or hand). Consequently, there is a desire to provide control systems for window regulators, for example, that achieve S5 compliance per FMVSS118. More specifically, the challenge is producing a system including a smart motor and/or motor control system that is capable of detecting and reacting quickly enough to meet this stringent standard for pinch protection during a window closing event.

Many known window regulators employ brushed direct current (DC) motors to operate the corresponding mechanisms for moving the windows. Such brushed motors typically have a rotating assembly with a high mass, which results in the window regulator system having a relatively higher inertia; however, high inertia of the window regulator system can cause decreased reaction time to pinch events, for example. The slower the system reacts, the higher the peak pinch force that may be result, so it can be difficult to meet the FMVSS118 S5 requirements using brushed DC motors. While one solution is the use of light weight brushed DC motors to reduce system inertia and increase response (e.g. motor stopping) times. Nevertheless, even if FMVSS118 S5 compliance can be achieved with a weak brushed motor, such weak light weight motors may be limited to only window regulators used for small, low mass windows that may not be suitable for all vehicle applications.

Accordingly, there remains a need for improved motor control systems used in power operated actuators and methods of operation thereof that overcome these shortcomings.

SUMMARY

This section provides a general summary of the present disclosure and is not a comprehensive disclosure of its full scope or all of its features and advantages.

It is an object of the present disclosure to provide a motor control system and a method of operating the control system that address and overcome the above-noted shortcomings.

Accordingly, it is an aspect of the present disclosure to provide a control system for controlling a brushless electric motor of a power operated actuator of a closure panel of a vehicle. The control system includes a vector control system configured to receive a torque current based on a measured angular velocity of the brushless electric motor and a first phase current and a second phase current and a third phase current from the brushless electric motor and determine an alpha stationary reference frame voltage and a beta stationary reference frame voltage based on the torque current. The vector control system also is configured to maintain the first phase current and the second phase current and the third phase current based on the alpha stationary reference frame voltage and the beta stationary reference frame voltage. The vector control system outputs a first phase pulse width modulation signal and a second phase pulse width modulation signal and a third phase pulse width modulation signal to the brushless electric motor. A vector torque current limiter is coupled to the vector control system and the brushless electric motor and is configured to determine the torque current drawn, receive the measured angular velocity of the brushless electric motor, and determine whether there is a reduction of the measured angular velocity relative to a predetermined speed limit. The vector torque current limiter is additionally configured to detect a pinch event of the closure panel and limit, and for example may reduce, the torque current in response to determining there is a reduction of the measured angular velocity of the brushless electric motor.

In accordance with a related aspect of the control system, the vector control system further includes a first proportional-integral control unit configured to receive the torque current based on the measured angular velocity of the brushless electric motor and a torque current drawn and output a torque voltage command and a flux linkage voltage command using the torque current and the torque current drawn, an inverse Park transformation unit coupled to the first proportional-integral control unit and configured to receive an angular position of the brushless electric motor and transform the torque voltage command and the flux linkage voltage command to the alpha stationary reference frame voltage and the beta stationary reference frame voltage using an inverse Park transformation, a switching states vector pulse width modulation unit coupled to the inverse Park transformation unit and to the brushless electric motor and configured to determine and output the first phase pulse width modulation signal and the second phase pulse width modulation signal and the third phase pulse width modulation signal to the brushless electric motor, a Clarke transformation unit coupled to the brushless electric motor and configured to receive the first phase current and the second phase current and the third phase current from the brushless electric motor and determine and output an alpha stationary reference frame current land a beta stationary reference frame current using a Clarke transformation, a Park transformation unit coupled to the Clarke transformation unit and configured to receive the alpha stationary reference frame current and the beta stationary reference frame current and determine and output the torque current drawn and a field flux linkage current drawn using a Park transformation, an integrator unit having an integrator input coupled to the brushless electric motor and an integrator output coupled to the inverse Park transformation unit and configured to receive the measured angular velocity from the brushless electric motor and perform a mathematical integration of the measured angular velocity and output the angular position at the integrator output to the inverse Park transformation unit, and a second proportional-integral control unit coupled to the inverse Park transformation unit and the Park transformation unit and configured to receive a reference flux linkage current and the flux linkage current drawn and determine and output the flux linkage voltage command to the inverse Park transformation unit.

In accordance with a related aspect of the control system, the vector torque current limiter includes a third proportional-integral control unit having a third reference input being a target angular velocity of the brushless electric motor and a third measured input coupled to the brushless electric motor for receiving the measured angular velocity $\omega$ and a torque current output and configured to receive the target angular velocity and the measured angular velocity and determine and output a controlled torque current at the torque current output, and a torque current limiting module having a first limiting module input coupled to the torque current output and a second limiting module input and a limiting module output and configured to receive the controlled torque current and output the torque current at the limiting module output.

In accordance with a related aspect of the control system, the vector torque current limiter further includes a historical torque current module having a historical input of the torque current drawn and a historical output and configured to receive the torque current drawn and update a previously determined vector torque current drawn and output the previously determined vector torque current drawn at the historical output to the torque current limiting module and the torque current limiting module is further configured to receive the previously determined vector torque current drawn at the second limiting module input and adjust the torque current at the limiting module output accordingly.

In accordance with a related aspect of the control system, the vector torque current limiter further includes a speed profile module having a profile input being the measured angular velocity of the brushless electric motor and a profile output coupled to the third reference input of the third proportional-integral control unit and configured to receive the measured angular velocity $\omega$ and determine and output the target angular velocity at the profile output.

In accordance with a related aspect of the control system, the vector torque current limiter is further configured to determine that the brushless electric motor has been commanded to move, and adjust the output the target angular velocity to move the brushless electric motor in response to determining that the brushless electric motor has been commanded to move.

In accordance with a related aspect of the control system, the torque current limiting module of the vector torque current limiter is further configured to limit the controlled torque current at a position of the brushless electric motor within a predetermined percentage of a previous controlled torque current corresponding to the position of the brushless electric motor, and backup the controlled torque current as the previous controlled torque current.

In accordance with a related aspect of the control system, the vector torque current limiter is further configured to start and increment a counter in response to the measured angular velocity $\omega$ being less than the predetermined speed limit, return to the step of limiting the controlled torque current at a position of the brushless electric motor within the predetermined percentage of the previous controlled torque current corresponding to the position of the brushless electric motor in response to the measured angular velocity not being less than the predetermined speed limit, determine whether the counter is less than the predetermined time period, and conclude there is a pinch event in response to determining that the counter is not less than the predetermined time period and the measured angular velocity being less than the predetermined speed limit.

In accordance with a related aspect of the control system, the Clarke transformation unit has a first phase current input and a second phase current input and a third phase current input each coupled to the brushless electric motor for receiving the first phase current and the second phase current and the third phase current and an alpha stationary reference frame current output coupled to the Park transformation unit for outputting the alpha stationary reference frame current and a beta stationary reference frame current output coupled to the Park transformation unit for outputting the beta stationary reference frame current.

In accordance with a related aspect of the control system, the Park transformation unit has an alpha stationary reference frame current input coupled to the alpha stationary reference frame current output of the Clarke transformation unit for receiving the alpha stationary reference frame current and a beta stationary reference frame current input coupled to the beta stationary reference frame current output of the Clarke transformation unit for receiving the beta stationary reference frame current and a torque current drawn output coupled to the first proportional-integral control unit and to the historical input of the historical torque current module for outputting the torque current drawn and a field flux linkage current drawn output coupled to the second proportional-integral control unit for outputting the field flux current drawn.

In accordance with a related aspect of the control system, the second proportional-integral control unit has a second reference input being the reference flux linkage current and a second measured input coupled to the flux linkage current drawn output of the Park transformation unit for receiving the flux linkage current drawn and a flux linkage voltage output coupled to the inverse Park transformation unit for outputting the flux linkage voltage command.

In accordance with a related aspect of the control system, the first proportional-integral control unit has a first reference input coupled to the torque current output of the torque current limiting module for receiving the torque current and a first measured input coupled to the torque current drawn output for receiving the torque current drawn and a torque voltage output coupled to the inverse Park transformation unit for outputting the torque voltage command.

In accordance with a related aspect of the control system, the inverse Park transformation unit has a first inverse Park input coupled to the torque voltage output of the first proportional-integral control unit for receiving the torque voltage command and a second inverse Park input coupled to the flux linkage voltage output of the second proportional-integral control unit for receiving the flux linkage voltage command and a third inverse Park input coupled to the integrator output of the integrator unit for receiving the angular position and an alpha stationary reference frame voltage output coupled to the switching states vector pulse width modulation unit for outputting the alpha stationary reference frame voltage and a beta stationary reference frame voltage output coupled to the switching states vector pulse width modulation unit for outputting the beta stationary reference frame voltage.

In accordance with a related aspect of the control system, the switching states vector pulse width modulation unit has an alpha stationary reference frame voltage input coupled to the alpha stationary reference frame voltage output of the inverse Park transformation unit for receiving the alpha stationary reference frame voltage and a beta stationary reference frame voltage input coupled to the beta stationary reference frame voltage output of the inverse Park transformation unit for receiving the beta stationary reference frame voltage and a first phase pulse width modulation output coupled to the brushless electric motor for outputting the first phase pulse modulation signal and a second phase pulse width modulation output coupled to the brushless electric motor for outputting the second phase pulse modulation signal and a third phase pulse width modulation output coupled to the brushless electric motor for outputting the third phase pulse width modulation signal.

In accordance with a related aspect of the control system, the control system is in communication with a remote actuation device and the control system is further configured to permit movement of the brushless electric motor when the remote actuation device is greater than six meters from the vehicle.

In accordance with a related aspect of the control system, the control system is further configured to communicate with the remote actuation device if the remote actuation device and vehicle are separated by an opaque surface when the remote actuation device is greater than eleven meters from the vehicle.

In accordance with a related aspect of the control system, the control system is further configured to start to close the closure panel from a static position to create an opening between the closure panel and the vehicle so small that a four millimeter diameter semi-rigid cylindrical rod can be placed through the opening at any location around an edge of the opening.

In accordance with another aspect, there is provided a power-operated closure system for use in a motor vehicle to move a closure member between an open position and a closed position, including a powered operated actuator coupled to the closure member and operable for moving the closure member between the open and closed positions, the powered actuator unit including a brushless DC (BLDC) electric motor and a controller configured to control the brushless DC (BLDC) electric motor using a field oriented control (FOC) method.

In accordance with another aspect, there is provided a control system for controlling a brushless electric motor of a power operated actuator of a closure panel of a vehicle, including a vector control system, and a vector torque current limiter coupled to said vector control system and the brushless electric motor and configured to determine the torque current drawn by the brushless electric motor, receive the measured angular velocity of the brushless electric motor, determine whether there is a reduction of the measured angular velocity relative to a predetermined speed limit, and detect a pinch event of the closure panel and limit the a torque current supplied to the brushless electric motor in response to determining there is a reduction of the measured angular velocity ω of the brushless electric motor.

According to another aspect of the disclosure, a method of controlling a brushless electric motor using a control system including a vector control system and a vector torque current limiter is also provided. The method includes the steps of determining that the brushless electric motor has been commanded to move and ramping up the brushless electric motor in response to determining that the brushless electric motor has been commanded to move using the vector control system. The method also includes the steps of determining a torque current drawn using the vector torque current limiter and receiving a measured angular velocity of the brushless electric motor using the vector torque current limiter. The method proceeds by determining whether there is a reduction of the measured angular velocity relative to a predetermined speed limit using the vector torque current limiter. The method additionally includes the step of detecting a pinch event of the closure panel and reducing the torque current in response to determining there is a reduction of the measured angular velocity of the brushless electric motor using the vector torque current limiter.

In accordance with a related aspect, the method further includes limiting the controlled torque current at a position of the brushless electric motor within a predetermined percentage of a previous controlled torque current corresponding to the position of the brushless electric motor using the vector torque current limiter, and backing up the controlled torque current as the previous controlled torque current using the vector torque current limiter.

In accordance with a related aspect, the method further starting and incrementing a counter in response to the measured angular velocity being less than the predetermined speed limit using the vector torque current limiter, returning to the step of limiting the controlled torque current at a position of the brushless electric motor within the predetermined percentage of the previous controlled torque current corresponding to the position of the brushless electric motor in response to the measured angular velocity not being less than the predetermined speed limit, determining whether the counter is less than the predetermined time period, and concluding there is a pinch event in response to determining that the counter is not less than the predetermined time period and the measured angular velocity being less than the predetermined speed limit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a side view of the closure panel of FIG. 2, illustrating a carrier module having a moveable window and a window regulator unit installed therewith, in accordance with an illustrative embodiment;

FIG. 4 is a side view of the carrier module of FIG. 3, illustrating the window regulator actuator unit, in accordance with an illustrative embodiment;

FIG. 15 illustrates a plurality of forces that can act on a window during its movement by the power operated actuator shown in FIG. 5 according to aspects of the disclosure;

DETAILED DESCRIPTION

Figure 2:
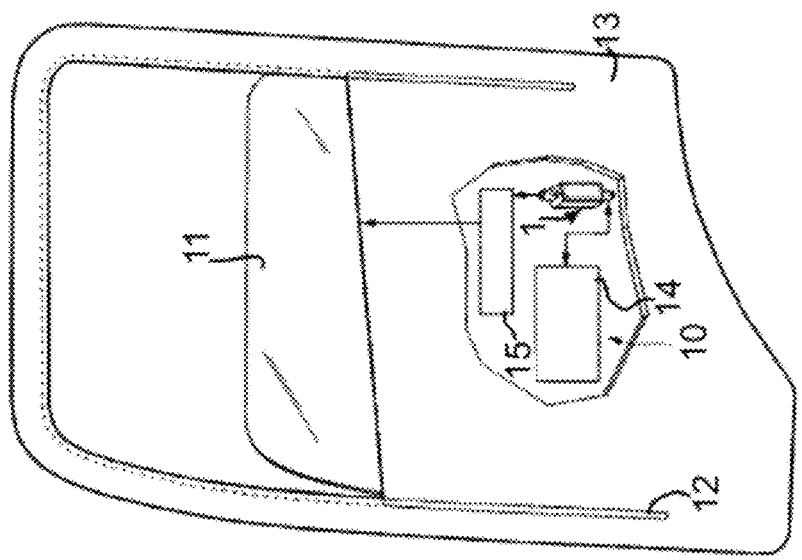
FIG. 2 is a side view of a closure panel having a moveable window and window regulator unit in accordance with an illustrative embodiment.

In the following description, details are set forth to provide an understanding of the present disclosure. In some instances, certain circuits, structures and techniques have not been described or shown in detail in order not to obscure the disclosure.

The expression "closure panel" will be used, in the following description and the accompanying claims, to generally indicate any element movable between an open position and a closed position, respectively opening and closing an access to an inner compartment of a motor vehicle, therefore including, boot, doors, liftgates, sliding doors, rear hatches, bonnet lid or other closed compartments, windows, sunroofs, in addition to the side doors of a motor vehicle.

In general, the present disclosure relates to a motor control system of the type well-suited for use in many electric motor applications. The motor control system and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Because brushed motors typically have a rotating assembly with a comparatively high mass, the inclusion of such motors in power operated actuators, such as window regulators, results in the corresponding power operated actuator system having a relatively higher inertia. High inertia of window regulator systems, for example, can cause decreased reaction time to pinch events, for example as a result of the motor having to overcome this inertia, to ensure the window is brought to a stop before the window can impart a damaging pinching force. Also, supporting components must be designed to resist the high inertia loads generated by the brushed motor, adding costs, size, and weight to the components. By using a brushless motor as the drive unit for power operated actuator systems, such as window regulator systems, instead of the traditional brushed motor, the mass of the corresponding rotating assembly can be significantly reduced. Consequently, the inertia of the actuator system can be reduced. By doing so, there is a significant improvement in the reaction time (e.g. stopping the rotation of the brushless motor) of the system to pinch events. Furthermore, system components strengths can be reduced as a consequence of not having to experience higher loads due to the high inertia forces generated by the motor, further reducing motor costs and the overall weight of the brushless motor.

Figure 1:
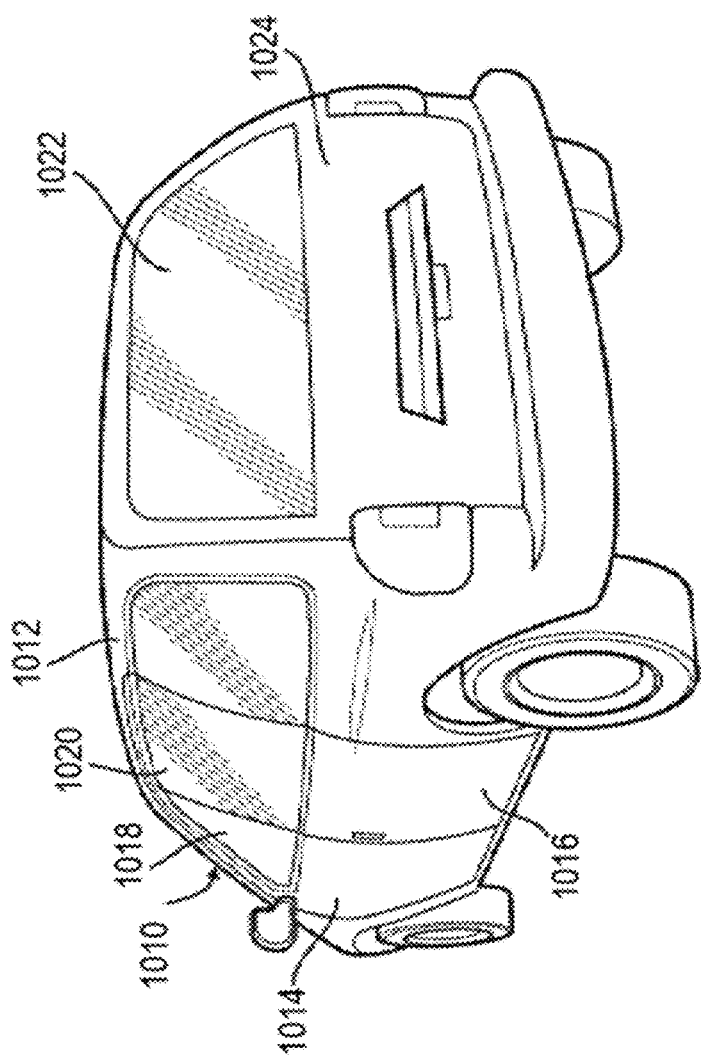
FIG. 1 is a perspective view of a motor vehicle including moveable windows and closure panels, in accordance with an illustrative embodiment.

Now referring initially to FIG. 1 of the drawings, an example of a motor vehicle 1010 is shown having a vehicle body 1012, a hinged front door 1014 and a sliding rear door 1016. Front door 1014 is equipped with a window 1018 which is moveable between closed and open positions via a power-operated window lift system. Similarly, rear door 1016 is equipped with a window 1020 which is moveable between closed and open positions via a power-operated window lift system. While the present disclosure will hereinafter be specifically directed to describing the window lift system associated with rear sliding door 1016, those skilled in the art will recognize and appreciate that similar arrangements to that described herein can be adapted for use with front door 1014 and/or a window 1022 associated with a hinged liftgate 1024, as well as any other type of closure panel. Further, those skilled in the art will recognize and appreciate that similar arrangements to that described herein can be adapted for use in other motor applications, such as a motor for a vehicle closure latch assembly for example a power release or power lock motor, a motor for a cinch mechanism, a motor for a power actuator for moving a closure panel. Also the control methodologies and corresponding systems can be applied to applications outside the automotive industries requiring increased performance for improved motor control, and for example improved motor stopping in response to an obstacle, such as elevators, commercial closures such as sliding doors and revolving doors, garage doors, and the like.

As best shown in FIG. 2, an automotive power operated actuator 10 of a power-operated window lift system for the motor vehicle 1010, in particular a window regulator is provided. The power operated actuator 10 is operable for driving a slider pane or window 11, such as window 1020 of FIG. 1, between open and closed positions with respect to a supporting frame 12, fixed to a vehicle door 13, such as door 1016. The power operated actuator 10 includes the brushless electric motor 1, for example a permanent magnet synchronous motor (PMSM) (e.g., made as shown in FIG. 6 for example), and a control circuit 14, electrically coupled to the brushless electric motor 1, and including (as will be discussed in the following) suitable hardware and/or software to control the operation of the same brushless electric motor 1.

Referring now to FIG. 3, in addition to FIGS. 1 and 2, a door panel 1028 associated with sliding door 1016 or vehicle door 13, for example, is disclosed. A door module 1030 is adapted to be mounted to door panel 1028. Door module 1030 includes a carrier 1044 that supports multiple door hardware components 1047 such as, for example, a power-operated cinch latch 1046, a power-operated door latch 1050, and a power-operated window lift system including a window regulator mechanism 1053 and a powered actuator unit 1052, also referred to as a powered operated actuator, including for example a brushless motor such as brushless electric motor 1, also referred to as a a brushless DC (BLDC) electric motor. Cinch latch 1046 is mounted to carrier 1044 via a presenter 1048 while door latch 1050 is also mounted to carrier 1044 via another presenter 1051. Window regulator mechanism 1053 is shown, in this non-limiting example, to include a pair of laterally-spaced guide rails 1054a and 1054b as well as a corresponding pair of window lifter plates 1056a and 1056b. Window 1020 is adapted to be mounted to lifter plates 1056a and 1056b for bi-directional translational movement along guide rails 1054a, 1054b. A cable-pulley type of lift mechanism (not shown) is provided for interconnecting lifter plates 1056a, 1056b to power actuator unit 1052 including brushless electric motor 1. FIGS. 3 and 4 illustrate lifter plates 1056a, 1052b positioned along an upper end of guide rails 1054a, 1054b so as to locate window 1020 in its closed position. As will be noted, lifter plates 1056a, 1056b are shown in phantom in FIG. 4 to also be capable of being located along a lower end of guide rails 1054a, 1054b so as to locate window 1020 in its open position.

Figure 5:
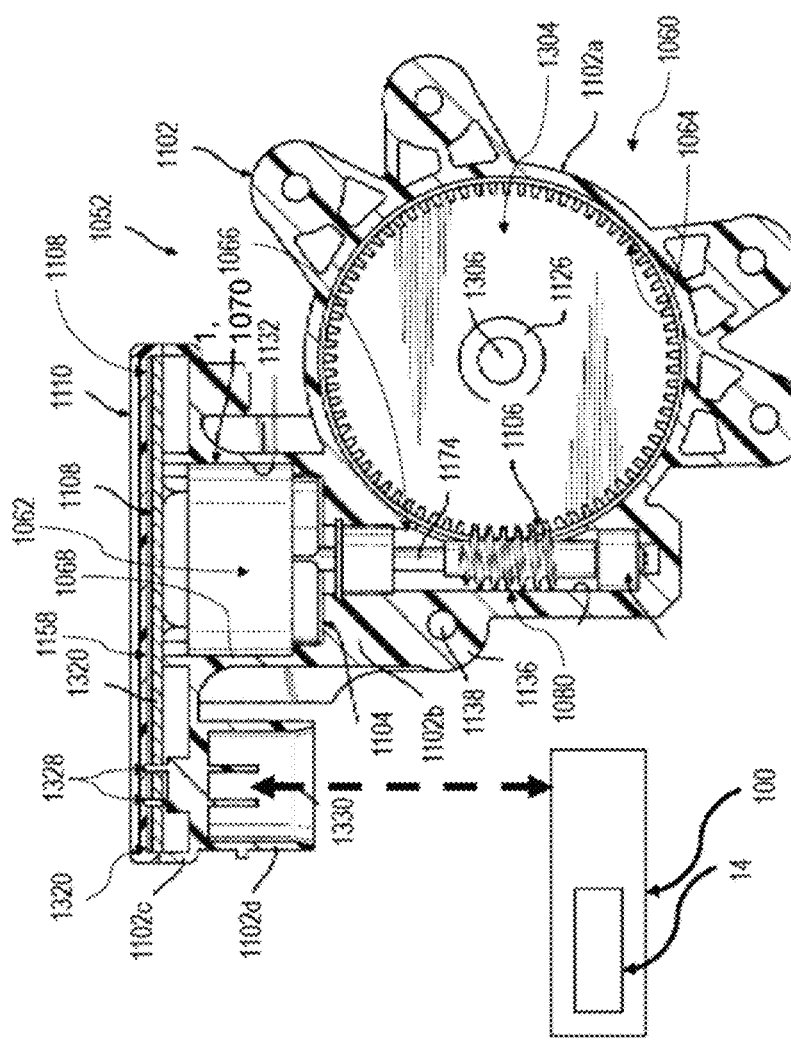
FIG. 5 is a side cross-sectional view of the window regulator actuator unit of FIG. 4, in accordance with an illustrative embodiment.

Now referring to FIG. 5, there is illustrated an example of a power actuator unit 1052 including a brushless electric motor 1. In accordance with an illustrative example, powered operated actuator 1052 may be a powered actuator unit as disclosed in US2017/0089115, the entire disclosure of which is incorporated herein by reference. FIG. 5 more specifically illustrates powered actuator unit 1052 including a drive housing 1060 and an electric motor assembly 1062. Drive housing 1060 defines a gear chamber 1064, a motor shaft chamber 1066 communicating with gear chamber 1064, and a motor mounting chamber 1068 communicating with shaft chamber 1066. A worm 1080 fixed to motor shaft 1174 is meshed with a large gear drive gear 1304 that is rotatably supported in gear chamber 1064. Rotation of the large gear 1304 includes an output shaft 1126 operably connected to a drum (not shown) to control rotation of the drum associated with the cable-pulley drive mechanism when large gear 1304 rotates. The brushless DC motor 1070, an embodiment of DC motor 1, is mounted in motor housing 1068 and is operable to control the amount and direction of rotation of motor shaft 1174. Housing 1060 includes several apertured mounting lugs for securing powered actuator unit 1052 to carrier 1044. Control signals, provided from a controller unit 100, also referred to generally as a controller, including the control circuit 14 as will be described herein below, are supplied to powered actuator unit 1052. Illustratively, the controller unit 100 is shown to be remote from the motor 1070 and electrically connected therewith via a wiring harness 1330 having one end secured in a plug in electrical connector 1102d extending from motor housing 1068. Control signals, may alternatively be provided from a locally-located controller unit 100 including the control circuit 14, for example as mounted to a printed circuit board (PCB) 1320 disposed within the drive housing 1060.

Figure 6:
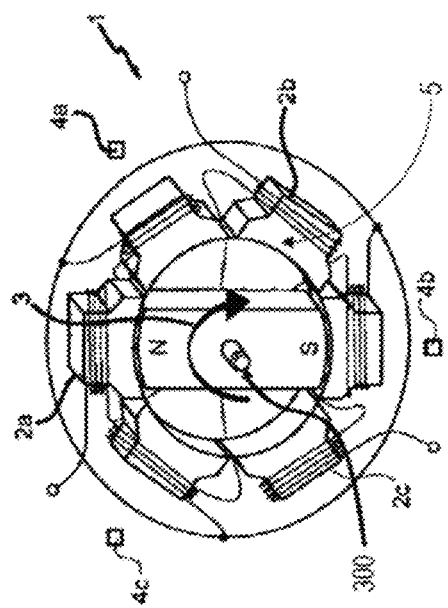
FIG. 6 is a diagrammatic view of a brushless motor of the window regulator actuator unit of FIG. 5, in accordance with an illustrative embodiment.

As schematically shown in FIG. 6, the brushless DC (Direct Current) electric motor 1 or simply brushless electric motor 1 includes a stator and number of stator windings 2a, 2b, 2c (three in the example, connected in a star configuration), and a rotor 3, having two poles ('N' or North and 'S' or South) in the example, which is operable to rotate with respect to the stator windings 2a, 2b, 2c. The rotor 3 may be connected to an output shaft 300 such as motor shaft 1174, which is in operable communication with a coupling 15, such as worm 1080, large gear drive gear 1304, and output shaft 1126, or other mechanism for imparting a movement the closure panel, such as window 11 illustrated in FIG. 2.

Figure 7:
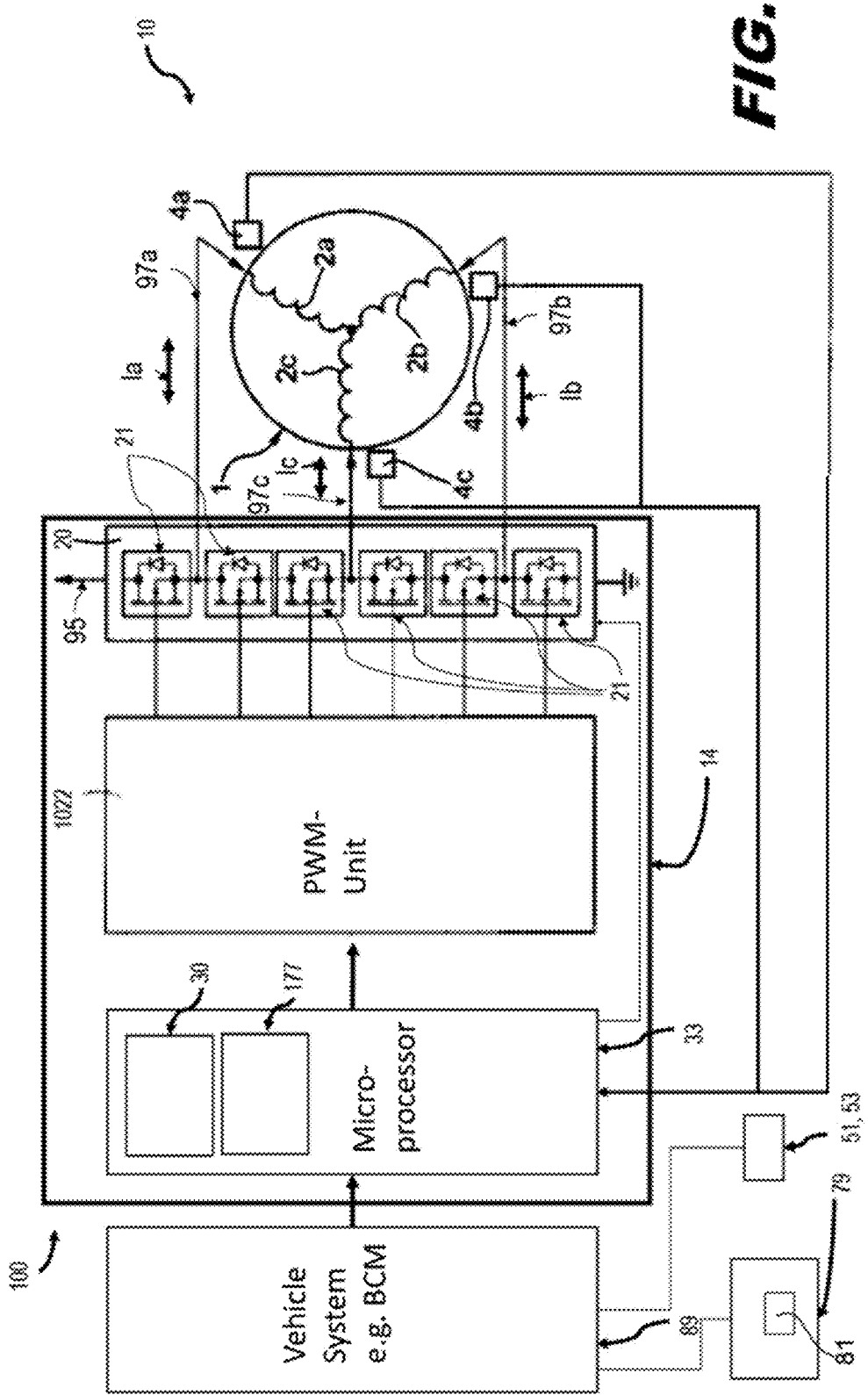
FIG. 7 is a block diagram of a control system for controlling the brushless motor of FIG. 6, in accordance with an illustrative embodiment.

Now referring to FIG. 7 in addition to FIG. 6, control of the brushless electric motor 1 envisages electrical periodical switching of the generated or phase currents Ia, Ib, Ic flowing in the stator windings 2a, 2b, 2c as energized by a DC power source (e.g., voltage source 95) in electrical communication with the windings 2a, 2b, 2c, in order to maintain the rotation of the rotor 3 via the resulting magnetic interaction. For example, the control circuit 14 of the power actuator 10 can include a microprocessor 33, a three-phase inverter 20, and a PWM (Pulse Width Modulation) unit 1022, coupled to the phase stator windings 2a, 2b, 2c. In a known manner, here not discussed in detail, the three-phase inverter 20 includes three pairs of power transistor switches 21 for each stator winding 2a, 2b, 2c, which are controlled by the PWM unit 1022 so as to drive the respective phase voltages either at a high (ON) or a low (OFF) value, in order to control the average value of related voltages/currents energizing the stator windings 2a, 2b, 2c. When the stator windings 2a, 2b, 2c are energized in a sequential order and magnitude, as determined by the microprocessor 33 controlling the PWM unit 1022 and the three-phase inverter 20, a moving magnetic flux 99 is generated which shifts clockwise or counterclockwise (see FIG. 13). This moving magnetic flux 99 interacts with the magnetic flux 101 generated by the permanent magnetic rotor 3 to cause the rotor 3 to rotate in a desired relation to magnetic flux 101. The rotational torque acting on the rotor 3 will impart a movement of the window 11, and any intervening components as part of the kinematic chain connecting the window 11 with the electrical motor 1, for example gears, couplings, rails, cables and the like if provided.

Figure 8:
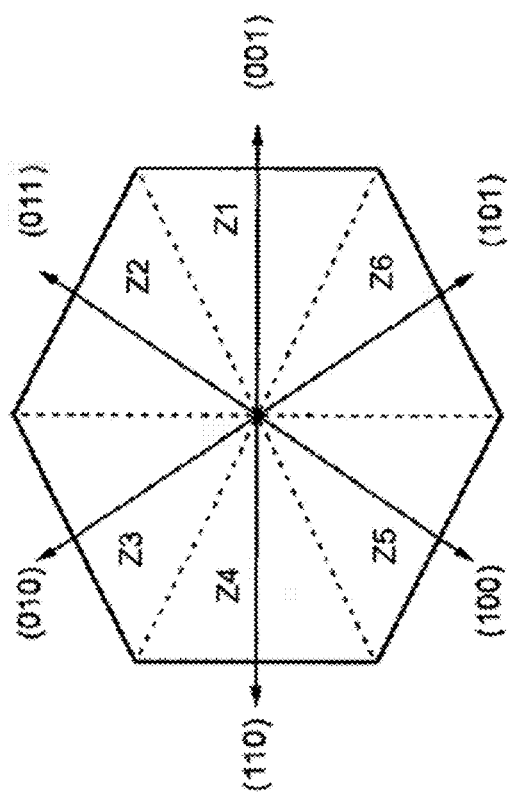
FIG. 8 is a schematic representation of operating zones of the brushless DC electric motor according to aspects of the disclosure.

Now referring to FIGS. 6, 7 and 8, the control action requires knowledge of the position of the rotor 3, during its rotation in order to control the energizing voltage/current pattern to be applied to the windings 2a, 2b, 2c, also known as commutation. Accordingly, Hall sensors, or other kinds of position sensors, shown schematically as 4a, 4b, 4c, are circumferentially arranged with respect to the stator windings 2a, 2b, 2c (e.g., with an angular distance of 120° of separation between them), in order to detect the position of the rotor 3, and electrically communicate the detected signals to the microprocessor 33. For example, using three on/off Hall position sensors 4a, 4b, 4c, the magnetic position of the rotor 3 may be detected for six different radial zones, as schematically shown in FIG. 8 (where the different codes e.g. 001, 101, 100, 110, 010, 011 corresponding to the outputs provided by the position sensors 4a, 4b, 4c are shown for each zone Z1, Z6, Z5, Z4, Z3, Z2). The commutation sequence is determined by the microprocessor 33 configured accordingly based on the relative positions of stator 5 and rotor 3, as measured by the either Hall-effect position sensors 4a, 4b, 4c. Other techniques for ascertaining the position of the rotor 3 may be provided for example by detecting the magnitude of the back electromagnetic force (EMF) (e.g., via the electrical lines 97a, 97b, 97c) generated as the rotor 3 rotates as part of a sensor-less position detection technique, as an example and without limitation.

Figure 9:
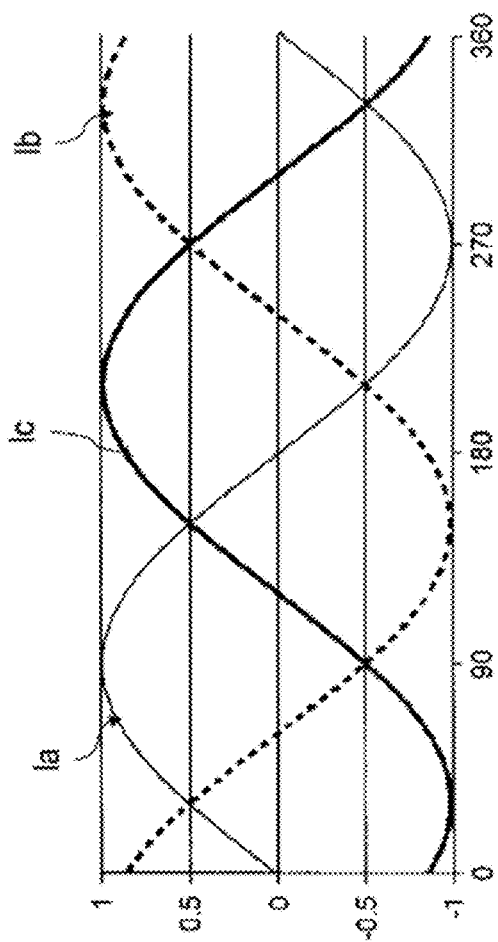
FIG. 9 shows plots of phase shifted 3-axis stator system electrical quantities associated to different driving modes of the brushless electric motor according to aspects of the disclosure.

Now referring to FIG. 9 in addition to FIG. 8, control of the brushless electric motor 1 may be implemented in a sinusoidal drive mode, whereby the brushless electric motor 1 is supplied by three-phase pulse width modulation (PWM) voltages modulated to obtain phase currents Ia, Ib, Ic of a sinusoidal shape in the stator windings 2a, 2b, 2c, or coils, as schematically shown in a smoothed format. With this sinusoidal commutation, all three electrical lines 97a, 97b, 97c connected with the stator windings 2a, 2b, 2c and the PWM unit 1022, are permanently energized with sinusoidal currents Ia, Ib, Ic, that are 120 degrees out of phase with each other. The resulting effect of the supplied current through the stator windings 2a, 2b, 2c is the generating of a North/South magnetic field 99 (FIG. 13) that rotates R inside the motor stator 5 as the currents Ia, Ib, Ic are varied. The commutation process of switching the current flowing through the stator windings 2a, 2b, 2c, is calculated by the microprocessor 33 controlling the PWM unit 1022 and inverter 20 (MOSFETs 21).

Figure 11:
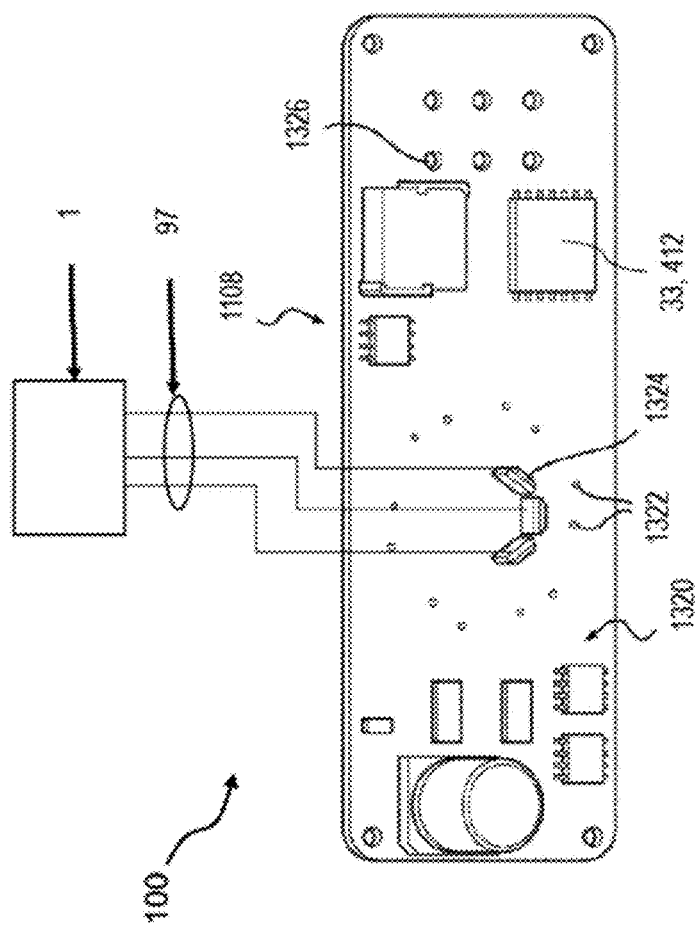
FIG. 10 and FIG. 11 show opposite sides of a printed circuit board having a control circuit for controlling the brushless motor of FIG. 5, in accordance with an illustrative embodiment.
Figure 10:
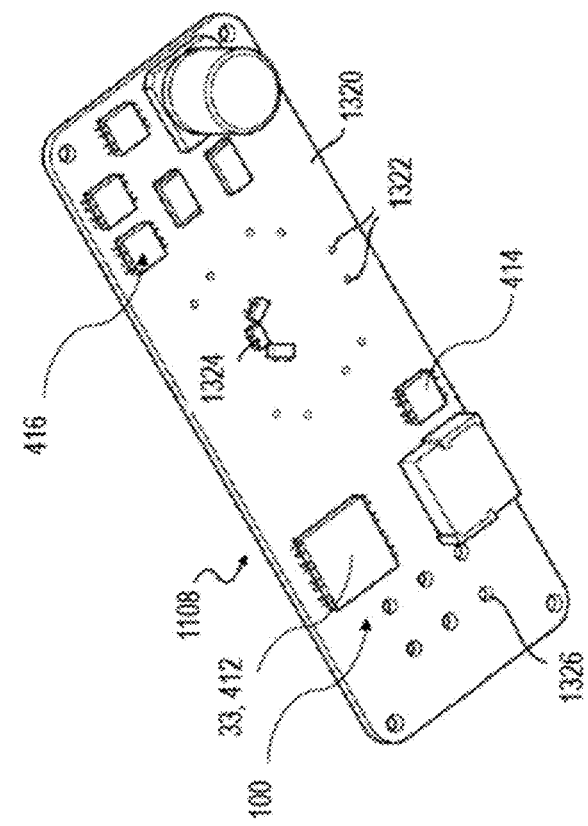

Now referring to FIGS. 10 and 11, in addition to FIG. 5, there is illustratively shown a controller arrangement 1108 embodying the controller unit 100. Controller arrangement 1108 is shown to generally include the PCB 1320 disposed within enclosure chamber 1158 upon installation of enclosure cover plate 1110 onto enclosure section 1102c of actuator housing 1102. PCB 1320 is shown to include various electrical or electronic components in electrical connection forming the circuit of control circuit 14 for controlling operation of powered actuator unit 10. Connector ports 1326 are formed in PCB 1320 and are configured and arranged to receive connector terminals 1328 associated with a plug-in electrical connector 1330 provided in connector section 1102d of housing 1102. The electronics mounted to the PCB 1320 and electrically interconnected with one another may include hardware components such as a microcontroller 412, such as microprocessor 33, and memory module 414, such as a memory chip, for storing software instructions and algorithms (e.g. code) for execution by the microcontroller 33, 412 of the motor control methods and techniques as described herein. Other components such as resistors, inductors, and capacitors and other signal conditioning/supporting components for operating the microcontroller 412 and memory module 414 to control the motor 1 are provided. For example, instructions and code stored on the memory module 414 may also be related to various system modules, for example application programming interfaces (API) modules, drive API, digital input output API, Diagnostic API, Communication API, and communication drivers for LIN communications and CAN bus communications with a Body Control Module (BCM) 89 or other vehicle system. A Body Control Module 89 is a commonly known automotive electronic device, also known as a 'body computer' and is generally an electronic control unit responsible for monitoring and controlling various electronic accessories of a motor vehicle. While modules may be described as being loaded into memory module 414, it is understood that the modules could be implemented in hardware and/or software. Also mounted to the PCB 1320 may be FET hardware such as H Bridge FETs 416 (Field Effect Transistors), such as the power transistor switches 21 forming the inverter 20, and software loaded into the memory module 414 related to such FETs 416, such as FET APIs.

The instructions and algorithms (e.g., code) for execution by the microcontroller 33, 412 of the motor control methods and techniques as described herein may relate to the control of the H Bridge FETs 416 (including Field Effect Transistors, such as power transistor switches 21) to provide coordinated power (e.g., sinusoidal voltages to generate currents Ia, Ib, Ic) to the motor 1. Control of H Bridge FETs 416 as load switches to connect or disconnect the source of electrical energy 95 (voltage/current) by the microprocessor 33, 412 or a FET driver to control the motor 1 is described in more detail below. Illustratively, the microprocessor 33, 412 is electrically directly or indirectly connected to the H Bridge FETs 21, 416 for control thereof (e.g., for controlling of FET switching rate). The H Bridge FETs 21, 416 are connected to the motor 1 via the three electrical lines 97a, 97b, 97c, which are connected to connector pins 1324 mounted to the printed circuit board 1320. Sensed current signals as well as back EMF voltage signals generated by the rotation of the rotor 3 may also be illustratively received by the microprocessor 412 through the same electrical lines 97a, 97b, 97c. Additional connector pins (not shown) may be provided and be in electrical communication with Hall sensors 4a, 4b, 4c for receiving by the microprocessor 33, 412 position signals indicative of the position of the rotor 3. While controller unit 100 is illustrated as being integrated in the powered actuator unit 1052 for the window regulator, it is understood it may be integrated into another system, such as powered door opening actuator having a brushless motor for controlling the closing or opening of door 1014, 1016, 1024, or within a separate door control module mounted to the door 1014, 1016, 1024, for controlling a remote brushless motor which may be provided with an internal printed circuit board, similar to PCB 1320, microprocessor, memory, and FETs, for example.

The controller 100 is configured to implement a field oriented control method or algorithm embodied illustratively as stored instructions in memory module 414 as retrieved and executed by the microprocessor 33, 412, for controlling the brushless electric motor 1. Control system 30, as described in detail herein below, may be implemented in the controller arrangement 1108 whereby the field oriented control algorithms and/or methods may be represented as computer stored instructions and code stored on memory module 414, and/or may be internal to the microprocessor 33, 412 for controlling the motor 1 in accordance with a Field Oriented Control (FOC) control strategy as described herein. With Field Oriented Control (or Vector Control) brushless motor techniques, as described herein, the torque and the flux of the brushless motor 1 can be controlled independently for improving the window regulator anti-pinch detection of an object 59 (FIG. 3), such as a finger, between the window 11 and the frame 12, and the response time to control the force F moving the window 11 and which may be applied to the object 59 in the form of a pinch force as during a pinch event as shown in FIG. 3.

Figures 12, 14:
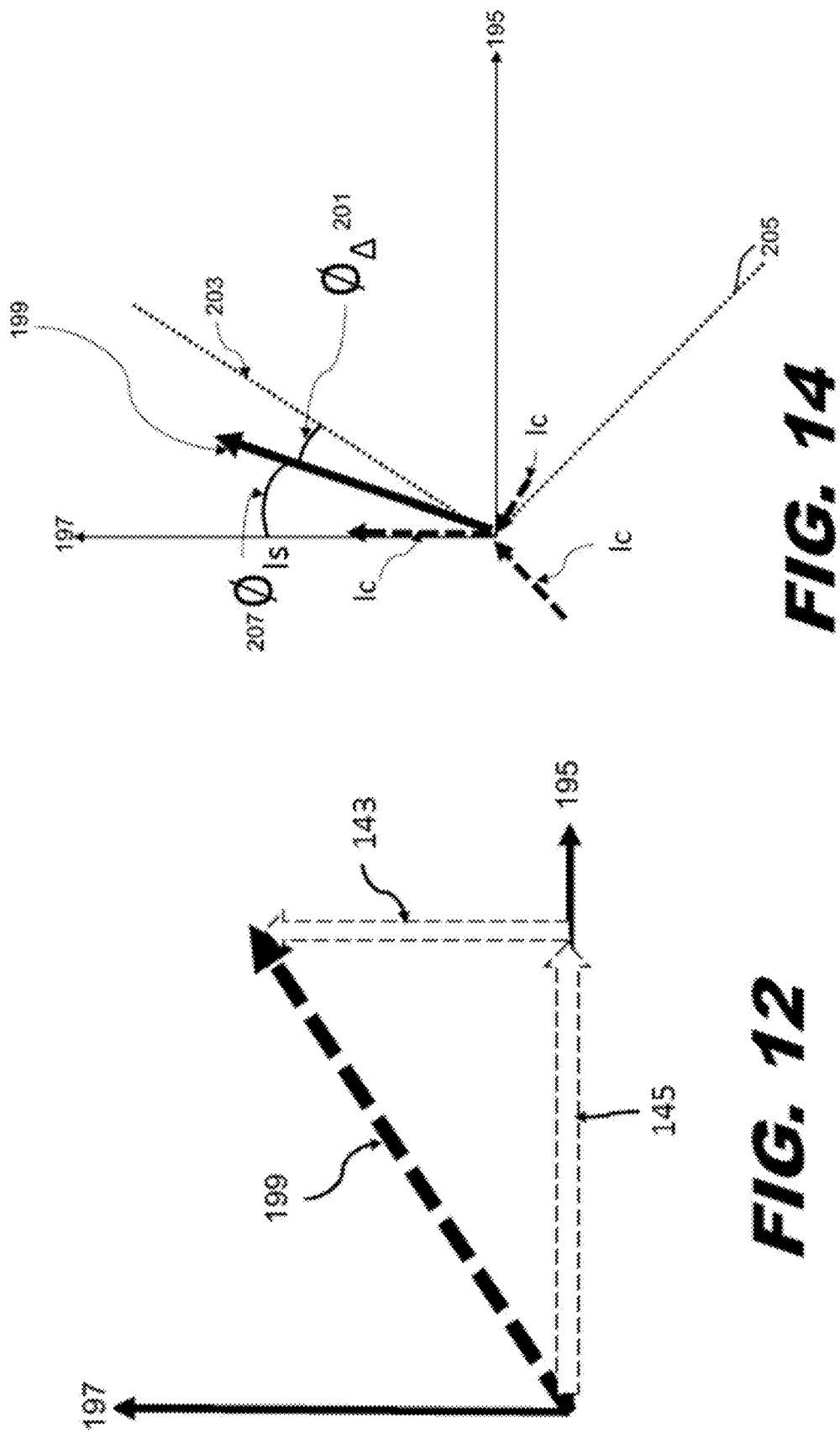
FIG. 12 illustrates a stator current vector decomposed into a 2-axis reference frame quadrature current and flux current components, in accordance with an illustrative embodiment.
FIG. 14 is a 3-axis representation of the 2-axis transformed stator current vector of FIG. 12, illustrating the delta between the stator current vector and the quadrature axis of the rotor, in accordance with an illustrative embodiment.
Figure 13:
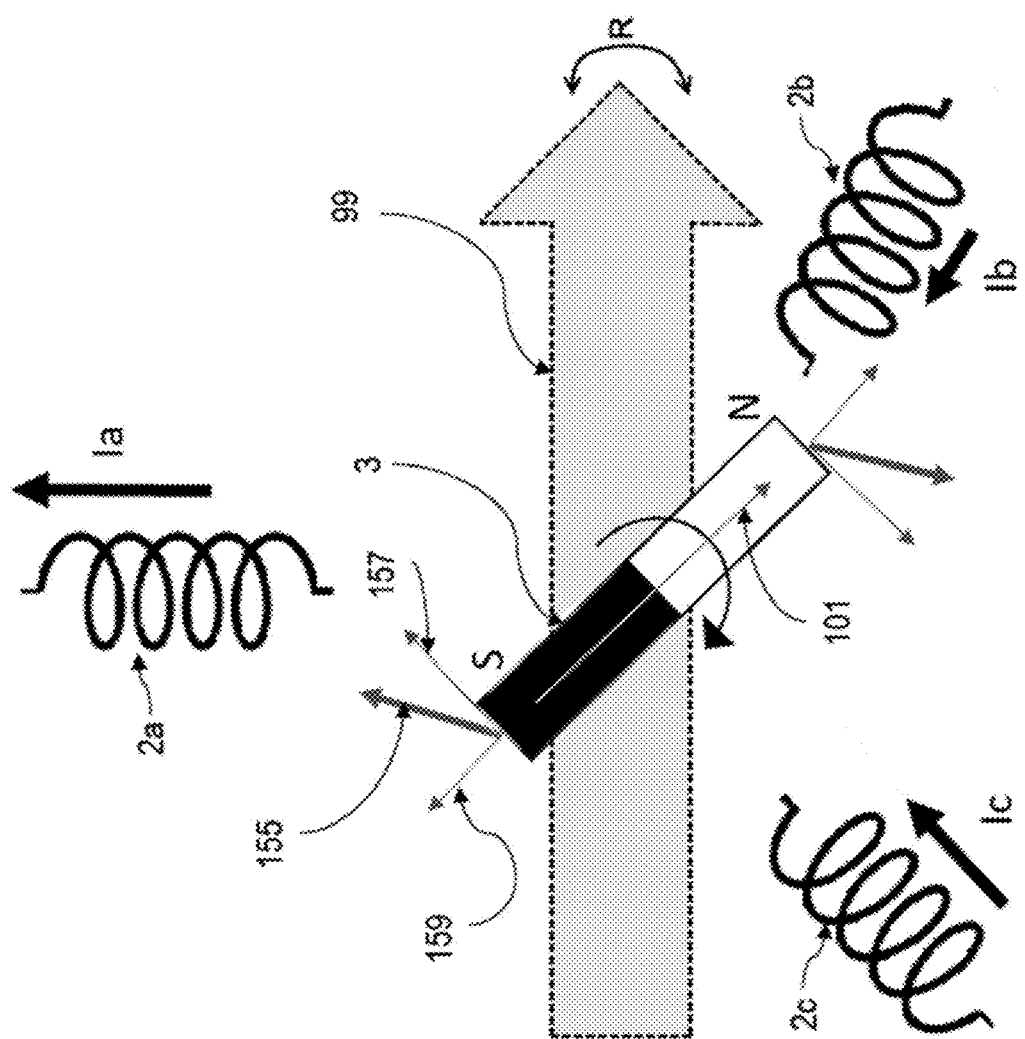
FIG. 13 is a diagrammatic view of the stator and rotor of a brushless motor illustrating the rotor magnetic field and the stator magnetic field, and quadrature and stator forces acting on the rotor, in accordance with an illustrative embodiment.

Referring now to FIG. 12, FIG. 13, and FIG. 14, the Field Oriented Control (or Vector Control) brushless motor technique optimizes the output torque generated by the rotor 3, for example acting on output shaft 300, over the angles of rotation of the rotor 3 relative to the windings 2a, 2b, 2c. The phase currents Ia, Ib, Ic supplied to the windings 2a, 2b, 2c will generate the stator field 99 that is targeted to be orthogonal to the field of the rotor 3. The optimal direction of the net stator field force 155 to maximize torque of the rotor 3 rotation is illustrated as arrow 157 which acts to rotate the rotor 3. The sub-optimal direction or pulling force of the net stator field force 155 is illustrated as arrow 159 which acts to outwardly pull on the rotor 3 and will generate no rotational torque on the rotor 3. When magnetic fields 99 and 101 are parallel, the net stator field force 155 will only include a component of the net stator field force 155 or torque force as indicated by arrow 159, and therefore no torque is produced on the rotor 3. When magnetic fields 99 and field 101 are orthogonal, the net stator field force 155 will only include the net stator field force 155 component as indicated by arrow 157, and therefore maximum torque is produced on the rotor 3. Field Oriented Control (or Vector Control) targets to eliminate (e.g., 0) the pulling force 159 to maximize the torque force 157. FIG. 14 is a 3-axis representation of the 2-axis transformed stator current vector 199, illustrating the delta 201 between the stator current vector 199 and the quadrature axis 203, shown perpendicular to the Direct-Axis 205 of the rotor 3. Delta 207 illustrates a delta between the stator current vector 199 and the Quadrature axis 197.

In order to maximize the torque in such a manner, the currents Ia, Ib, Ic, and voltages applied, or supplied, to the windings 2a, 2b, 2c are controlled separately and as a function of rotor 3 angular position relative to the windings 2a, 2b, 2c, in order to align the stator field 99 in an orthogonal orientation with the rotor magnetic field 101. The phase shifted resultant stator current Is 199 as shown in FIG. 14 can be mathematically decomposed into two components as illustrated in FIG. 12: a Quadrature current $\breve{I}q$, or also referred to as torque current, which induces in the rotor 3 rotation according to the orthogonal force 157 acting on the rotor 3; and a Direct current Id, or also referred to as flux linkage current which induces the outward pulling force 159 on the rotor 3. The Field Oriented Control technique is concerned with adjusting these 2-axis domain components Id, $\breve{I}q$, which are transformed using a transform function into the stator 3-axis domain as the three supplied current signals Ia, Ib, Ic in order to reduce or eliminate the flux current Id to nil, leaving only the torque current $\breve{I}q$ to generate the stator magnetic field 99 in quadrature with the quadrature axis of the rotor 3, as shown by arrow 157. Depending on the desired control objective, the fluxes can be adjusted accordingly. By adjusting the supplied motor currents and voltages with reference to the rotor's flux and quadrature axes, precise control of the rotation of the rotor 3 results, such as decreases or increases in the rotation of the rotor 3 can be precisely and quickly controlled since the torque current $\breve{I}q$ can be adjusted based on the position of the rotor 3 which remains synchronized during rotation. FOC control can therefore provide faster dynamic response than compared with brushed motor control, for example, those using trapezoidal commutated control, and when applied to a brushless motor application requiring anti-pinch/obstacle detection functionality as illustratively identified herein. Faster motor response times are desirable for window regulator applications, for example, to meet and surpass anti-pinch regulations (e.g., torque current $\breve{I}q$ can be precisely reduced or limited and have an immediate effect on the rotor 3 rotation in order to reduce pinch forces 18 (FIG. 15)). If higher regulation standards can be met, then safety concerns are mitigated and more advanced vehicle functions can be provided. Accordingly, since vector control allows for more precise control, as well as directly monitoring in torque current of the brushless motor rotor 3, proposed herein is a FOC strategy that also allows for precise control and monitoring of the brushless motor 1 during a pinch/obstacle event causing a reduction in motor speed (generally, it will be shown that torque is incrementally limited during a pinch/obstacle event).

Furthermore, in some power operated actuator systems, feedback control of the rotation of a rotor is based on speed differences between the actual motor speed that occurs if there is a drop in motor speed, for example caused by a pinch/obstacle event, and a target motor speed. In response the voltage applied to the motor 1 will be increased by a control system to increase the motor speed to meet the target motor speed. In typical brushless motor control systems, maintaining operating speed is the concern such as in brushless motor control for fans and pumps; however, for anti-pinch/obstacle concerns, feedback based speed control is not desirable. A torque based feedback control using FOC could also be implemented, where a desired torque output is required to be maintained for the application. These speed/torque objectives are typically in the context of brushless motors used for pump and fan control, where it is required to maintain the pump or fan at operating levels for maintaining system performance which is achieved when the motors are operated at constant outputs. Concerns such as an obstacle detection, or anti-pinch or strain on components are not present in these systems, as in the case of design of power operated actuators for closure panels. It is hereby recognized that FOC provides the precise torque adjustments and monitoring beneficial for anti-pinch/obstacle concerns. So in some existing systems, as part of the control of the brushless electric motor 1, the existing control system would do the opposite the system and method disclosed herein does, and would instead increase the torque/speed to compensate for the decrease in the detected torque/speed during a motor speed decrease. However, during a pinch event, increasing the torque/speed increases inertia in the system, in turn increasing pinch forces and stopping times due to corresponding increases in inertia, and increases the strains and forces on the system components, opposite of what is desired for power operated actuators for closure panels.

Referring now to FIG. 15, a plurality of forces 16, 18, 20, 22 are shown acting on the window 11 during its movement by the power operated actuator 10. Specifically, the plurality of forces 16, 18, 20, 22 can include a motor force 16 of the brushless electric motor 1 acting on the window 11 in a first direction. Counteracting the motor force 16 are a pinch force 18, for example due to object 59, such as a finger, hindering movement of window 11, a friction force 20 caused for example by friction of the rails/lifterplate, and a weight force 22 cause by the weight of the window 11 and other attached components such as the lifterplate.

Figure 16:
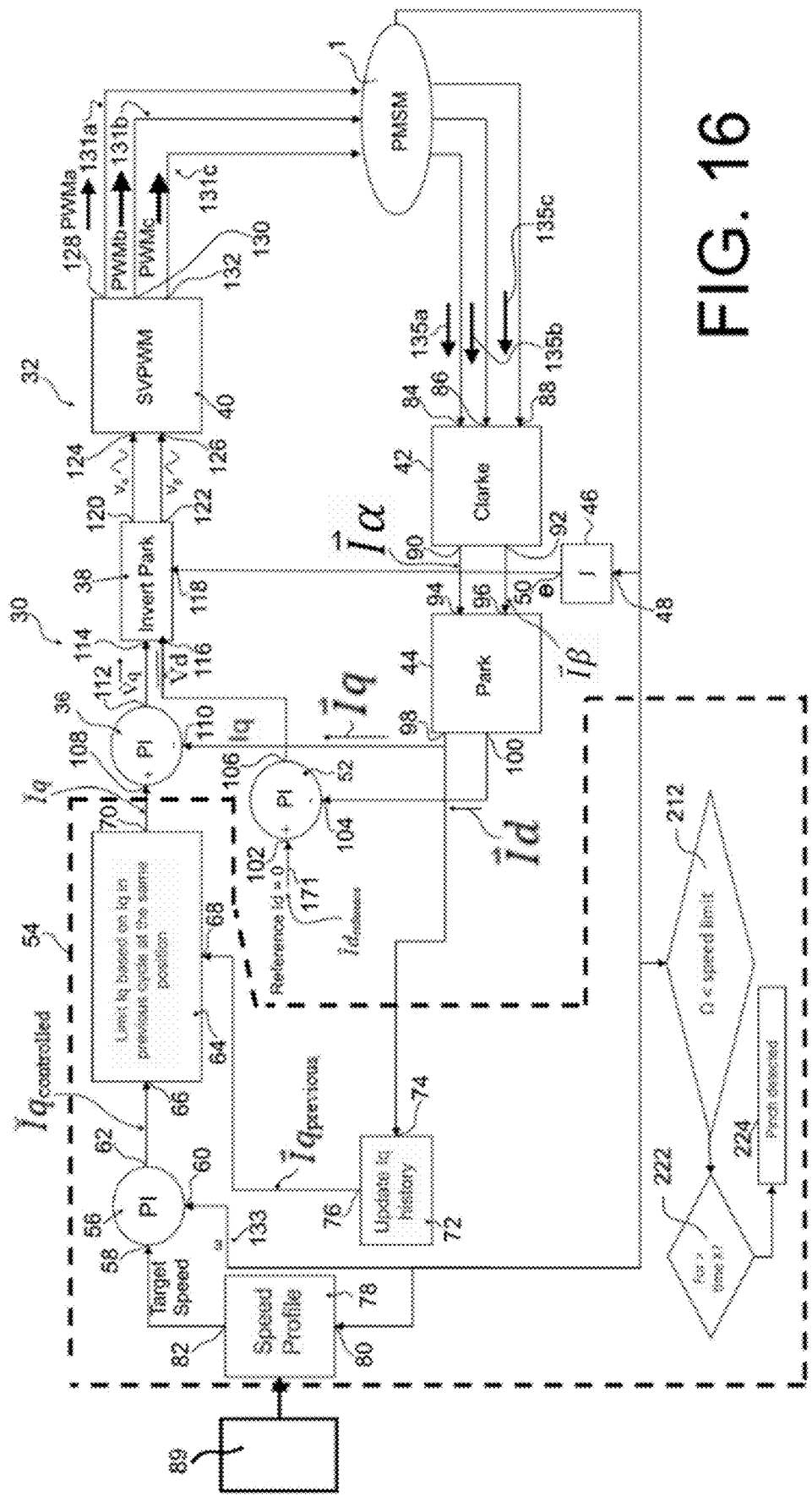
FIG. 16 is a block diagram of a control system for controlling the brushless electric motor shown in FIG. 6 of the power operated actuator in FIG. 5 of a closure panel of a vehicle according to aspects of the disclosure.

As best shown in FIG. 16, the control system 30 is provided for controlling the brushless electric motor 1 of the power operated actuator 10 of a closure panel (e.g., window 11) of the vehicle 1010. The control system 30 may be embodied in software as instructions stored in memory module 414 as executed by the microprocessor 33, 412 and/or hardware components which may be mounted to PCB 1320. The control system 30 includes a vector control system 32 configured to receive the torque current $\breve{I}q$ based on a measured, or detected angular velocity ω of the brushless electric motor 1 (e.g., determined using detected signals outputted from Hall sensors 4a, 4b, 4c of FIG. 7) and the first phase current Ia and the second phase current Ib and the third phase current Ic sensed from the brushless electric motor 1 (e.g., currents flowing through windings/coils 2a, 2b, 2c, which may include current components induced as a result of the rotation of the rotor 3 in addition to currents supplied to the windings/coils 2a, 2b, 2c). Angular velocity ω may be derived from the position signals detected from the Hall sensors 4a, 4b, 4c for example. The vector control system 32 is also configured to determine an alpha stationary reference frame voltage $\vec{V}\alpha$ and a beta stationary reference frame voltage based $\hat{V}\beta$ based on the sensed first phase current Ia, second phase current Ib, and third phase current Ic and maintain the first phase current Ia and the second phase current Ib and the third phase current Ic based on the alpha stationary reference frame voltage $\vec{V}\alpha$ and the beta stationary reference frame voltage $\hat{V}\beta$. In addition, the vector control system 32 is configured to output a first phase pulse width modulation signal PWMa and a second phase pulse width modulation signal PWMb and a third phase pulse width modulation signal PWMc to the brushless electric motor 1.

In more detail, the vector control system 32 includes a first proportional-integral (PI) control unit 36 configured to receive the torque current $\breve{I}q$ based on the measured angular velocity ω of the brushless electric motor 1 and a torque current drawn $\bar{I}q$ and output a torque voltage command $\hat{V}q$. An inverse Park transformation unit 38 is coupled to the first proportional-integral control unit 36 and is configured to receive an angular position θ of the brushless electric motor 1 and transform the torque voltage command $\hat{V}q$ and a flux linkage voltage command $\hat{V}d$ to the alpha stationary reference frame voltage $\hat{V}\alpha$ and the beta stationary reference frame voltage $\hat{V}\beta$ using an inverse Park transformation. A switching states vector pulse width modulation unit 40 is coupled to the inverse Park transformation unit 38 and to the brushless electric motor 1 and is configured to convert the alpha stationary reference frame voltage $\hat{V}\alpha$ and a beta stationary reference frame voltage $\hat{V}\beta$ to 3-phase stator reference signals and determine and output the first phase pulse width modulation signal PWMa and the second phase pulse width modulation signal PWMb and the third phase pulse width modulation signal PWMc to the brushless electric motor 1.

The vector control system 32 also includes a Clarke transformation unit 42 coupled to the brushless electric motor 1 that is configured to receive the first phase current $\bar{I}a$ and a second phase current $\bar{I}b$ and the third phase current $\bar{I}c$ from the brushless electric motor 1 and determine and output the alpha stationary reference frame current $i\bar{I}\alpha$ and the beta stationary reference frame current $\bar{I}\beta$ using a Clarke transformation (e.g., the Clarke transformation will convert the balanced three-phase currents sensed from the 3-axis system of the windings 2a, 2b, 2c, into two-phase quadrature stator currents of a 2-axis coordinate system. A Park transformation unit 44 is coupled to the Clarke transformation unit 42 and is configured to receive the alpha stationary reference frame current $\bar{I}\alpha$ and the beta stationary reference frame current $\bar{I}\beta$ and determine and output the torque current drawn $\bar{I}q$ and the field flux linkage current drawn $\bar{I}d$ using a Park transformation.

An integrator unit 46 has an integrator input 48 coupled to the brushless electric motor 1 and an integrator output 50 coupled to the inverse Park transformation unit 38. The integrator unit 46 is configured to receive the measured angular velocity ω from the brushless electric motor 1 and perform a mathematical integration of the measured angular velocity ω and output the angular position θ at the integrator output 50 to the inverse Park transformation unit 38.

A second proportional-integral control unit 52 is coupled to the inverse Park transformation unit 38 and the Park transformation unit 44 and is configured to receive a reference flux linkage current $\bar{I}d_{ref}$ and the flux linkage current drawn $\bar{I}d$ and determine and output the flux linkage voltage command $\hat{V}d$ to the inverse Park transformation unit 38.

The control system 30 also includes a vector torque current limiter 54 coupled to the vector control system 32 and the brushless electric motor 1 and is configured to determine the torque current $\breve{I}q$ and receive the measured angular velocity ω of the brushless electric motor 1. The vector torque current limiter 54 is also configured to determine whether there is a reduction of the measured angular velocity ω and detect a pinch event of the closure panel (e.g., window 11) and reduce or limit the torque current $\breve{I}q$ in response to determining there is a reduction of the measured angular velocity ω of the brushless electric motor 1. For example, the vector torque current limiter 54 may limit the Iq based on the Iq in the previous cycle at the same motor position.

The vector torque current limiter 54 specifically includes a third proportional-integral control unit 56 having a third reference input 58 being a target angular velocity of the brushless electric motor 1 and a third measured input 60 coupled to the brushless electric motor 1 for receiving the measured angular velocity ω. The third proportional-integral control unit 56 also has a torque current output 62 and is configured to receive the target angular velocity and the measured angular velocity ω and determine and output a controlled torque current $\breve{I}q_{controlled}$ at the torque current output 62.

The vector torque current limiter 54 also includes a torque current limiting module 64 having a first limiting module input 66 coupled to the torque current output 62 and a second limiting module input 68 and a limiting module output 70. The torque current limiting module 64 is configured to receive the controlled torque current $\vec{I}q_{controlled}$ and output the torque current $\vec{I}q$ at the limiting module output 70.

The torque current limiting module 64 is also configured to receive a previously stored vector torque current drawn $\vec{I}q_{previous}$ at the second limiting module input 68 and adjust the torque current $\vec{I}q$ at the limiting module output 70 accordingly. The torque current limiting module 64 is provided into which the PI controlled speed error signal (e.g., from the third proportional-integral control unit 56) has been converted into a vector torque current or control torque current $\vec{I}q_{controlled}$. The limiting function is applied to the PI controlled error signal ($\vec{I}q_{controlled}$ as a function of the previously stored vector torque current $\vec{I}q_{previous}$. The pinch detection, or obstacle detection is measured when the measured angular velocity ω, as sensed using hall sensors for example, drops below a threshold value Ω.

In more detail, the torque current limiting module 64 of the vector torque current limiter 54 is further configured to limit the controlled torque current $\vec{I}q_{controlled}$ at a position of the brushless electric motor 1 within a predetermined percentage (e.g., 5%, 10%, 20% etc.) of a previous vector torque current drawn $\vec{I}q_{previous}$ corresponding to the position of the brushless electric motor 1 and backup, or store in memory for example, the torque current drawn $\vec{I}q$ as the previous controlled torque current (to use by the torque current limiting module 64 in the next cycle). The vector torque current limiter 54 then starts and increments a counter 177, for example provided as a timer circuitry or software module provided as part of microprocessor 33, in response to the measured angular velocity ω being less than the predetermined speed limit and return to the step of limiting the controlled torque current $\vec{I}q_{controlled}$ at a position of the brushless electric motor 1 within the predetermined percentage of the previous vector torque current drawn $\vec{I}q$ corresponding to the position of the brushless electric motor 1 in response to the measured angular velocity ω not being less than the predetermined speed limit. Thus, a conditional motor speed detection calculation is made. The vector torque current limiter 54 determines whether the counter 177 is less than the predetermined time period and concludes there is a pinch event in response to determining that the counter 177 is not less than the predetermined time period and the measured angular velocity ω is less than the predetermined speed limit. In other words, the counter 177 is provided to determine measured angular velocity ω not being less than the predetermined speed limit for a given period of time. Consequently, sensitivity of a pinch detection is increased, for example, to differentiate between actual pinch (e.g., due to pinch force 18) or objects detected compared to other normal system operation conditions (e.g., slips in a window regulator cable due to changes in friction force 20), bumps in the road during a window closing affecting the inertia of the system (e.g., due to the weight force 22), etc.). As a result, the system 30 determines a pinch event based on an expiry of a predetermined timeout period during which torque current $\vec{I}q$ supplied to the brushless motor 1 is limited or reduced. Since the speed and corresponding inertia of the brushless motor 1 is capped and may be reduced before the time out period has expired, when a pinch event is determined, the control of the motor 1 to a stopped state (e.g. angular velocity is zero) or a reversed (e.g. driven in an opposite direction before the stopped state) state begins from lower speed and/or inertia state thereby improving response to a pinch/obstacle detected event. For example, the window 11 may be controlled to transition from a direction towards the closed position, to a stopped position, and reversed to move towards the open position.

So, the third proportional-integral control unit 56 will generate a torque current or controlled torque current $\vec{I}q_{controlled}$ based on an error speed signal to return the motor 1 back to the target angular velocity, if there is a drop in angular velocity or the rotor 3 due to a pinch/obstacle for example. However, this controlled torque current ($\vec{I}q_{controlled}$ is limited to a maximum amount based on the previously stored vector torque current drawn $\vec{I}q_{previous}$. This is to ensure that the control system 30 will not increase the speed of the motor 1 (e.g. rotor 3) and thereby increase inertia of the system in response to a reduction in the speed of the motor 1, which may occur as a result of a pinch. Also, if torque was increased before a pinch is detected, it would apply more pinching force 18 to the object 59, and the stopping time of the motor 1 would be increased, the opposite of what is required (e.g., a rapid decrease in pinch force) during anti-pinch and obstacle detection.

Such a limiting function is used to ensure that despite any differences in actual motor speed or measured angular velocity ω and a target motor speed (i.e., predetermined speed limit), the controlled torque current $\vec{I}q$ input to the first proportional-integral control unit 36 will not exceed a percentage based on the previous cycle's inputted current torque (represented and stored as stored vector torque current drawn $\vec{I}q_{previous}$) thereby applying a limiting function to the torque current $\vec{I}q$ at the limiting module output 70. For example, the memory cycle could be as broad as a previous open to close operation at the 50% open mark, or as precise as having multiple hysteresis points during the same window closing operation, in the case of a window regulator. Thus, the control system 30 can provide a learned torque current output of a normal operation, which can be used to compare to the torque current $\vec{I}q$ during an obstacle/pinch event.

The vector torque current limiter 54 further includes a historical torque current module 72 having a historical input 74 of the torque current drawn $\vec{I}q$ and a historical output 76. The historical torque current module 72 is configured to receive the torque current drawn $\vec{I}q$ and update the previously determined vector torque current drawn (e.g. update the Iq history) and output the previously determined vector torque current drawn $\vec{I}q_{previous}$ at the historical output 76 to the torque current limiting module 64. So, the vector torque current limiter 54 is enhanced with hysteresis, or memory, of a previously calculated vector torque current $\vec{I}q$ or previously determined vector torque current drawn $\vec{I}q_{previous}$ to ensure that the torque current $\vec{I}q$ is not increased too rapidly in response to a decrease in motor speed or measured angular velocity ω.

In addition, the vector torque current limiter 54 further includes a speed profile module 78 having a profile input 80 being the measured angular velocity ω of the brushless electric motor 1 and a profile output 82 coupled to the third reference input 58 of the third proportional-integral control unit 56. The speed profile module 78 is configured to receive the measured angular velocity ω and determine and output the target angular velocity (e.g. target speed) at the profile output 82. So, as a result of the precise control by the control system 30, a speed profile may be inputted as the target angular velocity, which can be adjusted based on the position of the object being moved (for example, using the Hall sensors 4a, 4b, 4c to determine the position of the closure panel indirectly, or by other position detection methods, e.g., directly) and the known geometry of the closure panel (e.g., lift gate 1024 to provide a certain opening profile, such as one that is equal over the open/close, or does not show any uneven opening behavior).

Furthermore, the vector torque current limiter 54 is further configured to determine that the brushless electric motor 1 has been commanded to move. The vector torque current limiter 54 ramps up the brushless electric motor 1 in response to determining that the brushless electric motor 1 has been commanded to move, for example, by the BCM 89, or by a wireless key FOB system. For instance, remote actuation device, also referred to as a wireless device, such as a FOB 79 or a wireless cellular phone e.g. smartphone or smartwatch, with an input 81 corresponding to a command such as a window close command. Such input, which may be an input button or an image of a button displayed on a touch screen, can command from a distance the motor 1 to move the window 11 closed when the user is out of sight of the window 11, and for example when the user does not have a direct visible line of sight to determine if an object 59 would experience a pinch in response to commanding the motor 1 to move the window 11. For example the user may press and release, immediately as an example, the button to generate the command, an example of the user performing a discontinuous interaction with the button. As another example, BCM 89 can issue a command to automatically close window 11 after a period of time (i.e., if a user walks away and forgets to close the window 11, the vehicle 1010 will close it for the user without the user having to operate the remote actuation device), and example of an automatic control of the window 11 without an input received by the Body Control Module from a user. As an additional example, rain sensors 53 detect rain and the BCM 89 can command the motor 1 to move to close the window 11, without any command received from the user. Also, dashboard light sensor 51 (for headlights) may detect darkness and automatically issue a command to automatically close window 11. And vice versa—if light sensor 51 detects it being too sunny it could also issue a command to automatically close window (e.g., if the owner has tinted the windows and wants to cover up from the sun). Also, for example, if the BCM 89 detects body motion of the vehicle 1010 by a motion sensor, such as an accelerometer, (e.g., from wind), it can issue a command to automatically close window 11 to keep debris from entering vehicle 1010. Sensors 53, 51 are examples of environmental sensors which may sense the condition of the environment. Accelerometer is yet another example of a sensor, and other types of sensors may be provided, such as a battery voltage level sensor, a water sensor, and the like without limitation.

Referring back to the vector control system 32, the Clarke transformation unit 42 has a first phase current input 84 and a second phase current input 86 and a third phase current input 88 each coupled to the brushless electric motor 1 for receiving the first phase current Ia and the second phase current Ib and the third phase current Ic. The Clarke transformation unit 42 also includes an alpha stationary reference frame current output 90 coupled to the Park transformation unit 44 for outputting the alpha stationary reference frame current $\vec{I}\alpha$ and a beta stationary reference frame current output 92 coupled to the Park transformation unit 44 for outputting the beta stationary reference frame current $\vec{I}\beta$.

The Park transformation unit 44 has an alpha stationary reference frame current input 94 coupled to the alpha stationary reference frame current output 90 of the Clarke transformation unit 42 for receiving the alpha stationary reference frame current $\vec{I}\alpha$ and a beta stationary reference frame current input 96 coupled to the beta stationary reference frame current output 92 of the Clarke transformation unit 42 for receiving the beta stationary reference frame current $\vec{I}\beta$. The Park transformation unit 44 also has a torque current drawn output 98 coupled to the first proportional-integral control unit 36 and to the historical input 74 of the historical torque current module 72 for outputting the torque current drawn torque current drawn $\vec{I}q$ and a field flux linkage current drawn output 100 coupled to the second proportional-integral control unit 52 for outputting the field flux current drawn $\vec{I}d$.

The second proportional-integral control unit 52 has a second reference input 102 being the reference flux linkage current $\vec{I}d_{reference}$ (e.g., reference flux linkage current=0 for reasons as described herein above to eliminate the force acting on the rotor 3 depicted by arrow 159) 171 and a second measured input 104 coupled to the flux linkage current drawn output 100 of the Park transformation unit 44 for receiving the flux linkage current drawn $\vec{I}d$ and a flux linkage voltage output 106 coupled to the inverse Park transformation unit 38 for outputting the flux linkage voltage command $\hat{V}d$.

Figure 17:
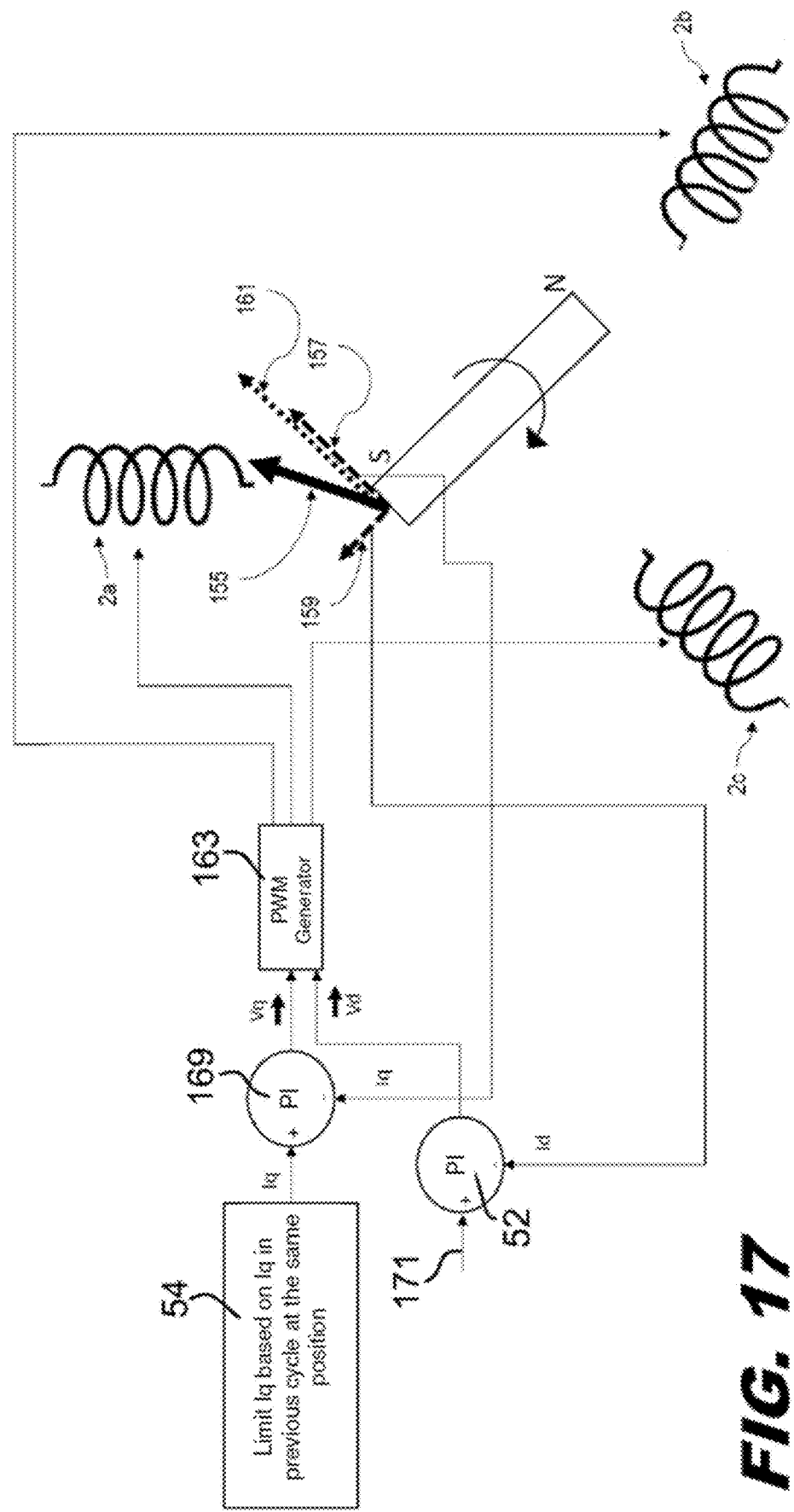
FIG. 17 is a block diagram of the control system of FIG. 16, illustrating the resultant changes in quadrature and flux current components as a result of a pinch event causing a change in the rotational speed of the rotor and an increase in the sensed torque current drawn, in accordance with an illustrative embodiment.

The first proportional-integral control unit 36 has a first reference input 108 coupled to the torque current output 70 of the torque current limiting module 64 for receiving the torque current (Ĭq). The torque current limiting module 64 may limit the Iq based on the Iq in the previous cycle at the same position for example. The first proportional-integral control unit 36 also has a first measured input 110 coupled to the torque current drawn output 98 for receiving the torque current drawn $\vec{I}q$ and a torque voltage output 112 coupled to the inverse Park transformation unit 38 for outputting the torque voltage command $\hat{V}q$. Thus, a PI controlled error signal of the torque currents is now performed, with now the reference value being the limited torque current or torque current from the torque current limiting module 64. It is hereby recognized that control system 30 takes advantage of the inherent properties of the brushless electric motor 1, specifically the property that when the brushless electric motor 1 is slowed, for example by a pinch event, the torque current drawn $\vec{I}q$ will increase. The PI integration 169 of the difference between the limited torque current Ĭq and this inherently increased torque current drawn $\vec{I}q$ as represented in FIG. 17 by arrow 161 will result in a lowered torque voltage command V̂q to be applied to the motor 1, thus further reducing measured angular velocity ω and inertia in the system. Therefore, the limiting function of the torque current limiting module 64 reduces the first reference input 108 compared to a non-limited torque current, while the torque current $\vec{I}q$ at the first measured input 110 would be increased due to a slowdown in the motor 1, making the difference larger resulting in a large torque voltage command $\hat{V}q$ decrease. Thus, the control system 30 successively limits and for example reduces, on each cycle for example, the torque current Ĭq of the stator current Is (Ia, Ib, Ic) applied to the brushless electric motor 1, thereby reducing the inertia of the motor 1 and the window 11, for example, during a pinch event. As a result of successively limited, for example reduced force being applied to a pinched object 59 during a feedback control of the brushless electric motor 1, as well as the precise vector control of the brushless electric motor 1 (e.g., the direct reduction of the torque output of the rotor 3) over successive cycles can be precisely made), making the predictability and sensitivity of the control system 30 under different loading robust to meet anti-pinch regulations. Therefore, the control system 30 and corresponding power operated actuator 10 can achieve and surpass existing anti-pinch regulations improving safety and functionality. In FIG. 17, box 163 represents a PWM generator module.

The inverse Park transformation unit 38 has a first inverse Park input 114 coupled to the torque voltage output 112 of the first proportional-integral control unit 36 for receiving the torque voltage command $\hat{V}q$. The inverse Park transformation unit 38 additionally has a second inverse Park input 116 coupled to the flux linkage voltage output 106 of the second proportional-integral control unit 52 for receiving the flux linkage voltage command $\hat{V}d$ and a third inverse Park input 118 coupled to the integrator output 50 of the integrator unit 46 for receiving the angular position θ. The inverse Park transformation unit 38 also has an alpha stationary reference frame voltage output 120 coupled to the switching states vector pulse width modulation unit 40 (SVPWM) for outputting the alpha stationary reference frame voltage $\hat{V}\alpha$ and a beta stationary reference frame voltage output 122 coupled to the switching states vector pulse width modulation unit 40 for outputting the alpha stationary reference frame voltage $\hat{V}\beta$.

The switching states vector pulse width modulation unit 40 converts the two component alpha stationary reference frame voltage $\hat{V}\alpha$ and the beta stationary reference frame voltage $\hat{V}\beta$ into the three component stator domain to generate the PWM signals to be supplied to each stator winding 2a, 2b, 2c. The switching states vector pulse width modulation unit 40 has an alpha stationary reference frame voltage input 124 coupled to the alpha stationary reference frame voltage output 120 of the inverse Park transformation unit 38 for receiving the alpha stationary reference frame voltage $\hat{V}\alpha$ and a beta stationary reference frame voltage input 126 coupled to the beta stationary reference frame voltage output 122 of the inverse Park transformation unit 38 for receiving the beta stationary reference frame voltage $\hat{V}\beta$. The switching states vector pulse width modulation unit 40 also has a first phase pulse width modulation output 128 coupled to the brushless electric motor 1 (e.g., to winding 2a) for outputting the first phase pulse modulation signal PWMa and a second phase pulse width modulation output 130 coupled to the brushless electric motor 1 (e.g., to winding 2b) for outputting the second phase pulse modulation signal PWMb and a third phase pulse width modulation output 132 coupled to the brushless electric motor 1 (e.g., to winding 2c) for outputting the third phase pulse width modulation signal PWMc.

As discussed, the control system 30 can be in communication with a remote actuation device (e.g. BCM 89 or wireless based access system), such as, but not limited to the key fob 79, as well as other sensors 51, 53, for example. Because the control system 30 disclosed herein is capable of detecting the pinch event as described above, the control system 30 permits movement of the brushless electric motor 1 when the remote actuation device 79 is greater than six meters from the vehicle 1010, as set forth in Federal Motor Vehicle Safety Standards (FMVSS) standard number 118, section 5 (S5). Similarly, the control system 30 can further be configured to communicate with the remote actuation device 79, if the remote actuation device and vehicle 1010 do not have a direct line of sight, for example are separated by an opaque surface, such as a wall, when the remote actuation device 79 is greater than eleven meters from the vehicle also set forth in FMVSS118 S5. The control system 30 is further configured, as a result of the rapid response described hereinabove, to start to close the closure panel (e.g., window 11) from a static position to create an opening between the closure panel and the vehicle so small that a four millimeter diameter semi-rigid cylindrical rod can be placed through the opening at any location around an edge of the opening, as set forth in FMVSS118 S5. Such capabilities are possible as a result of the improved detection of pinch events.

Figure 18:
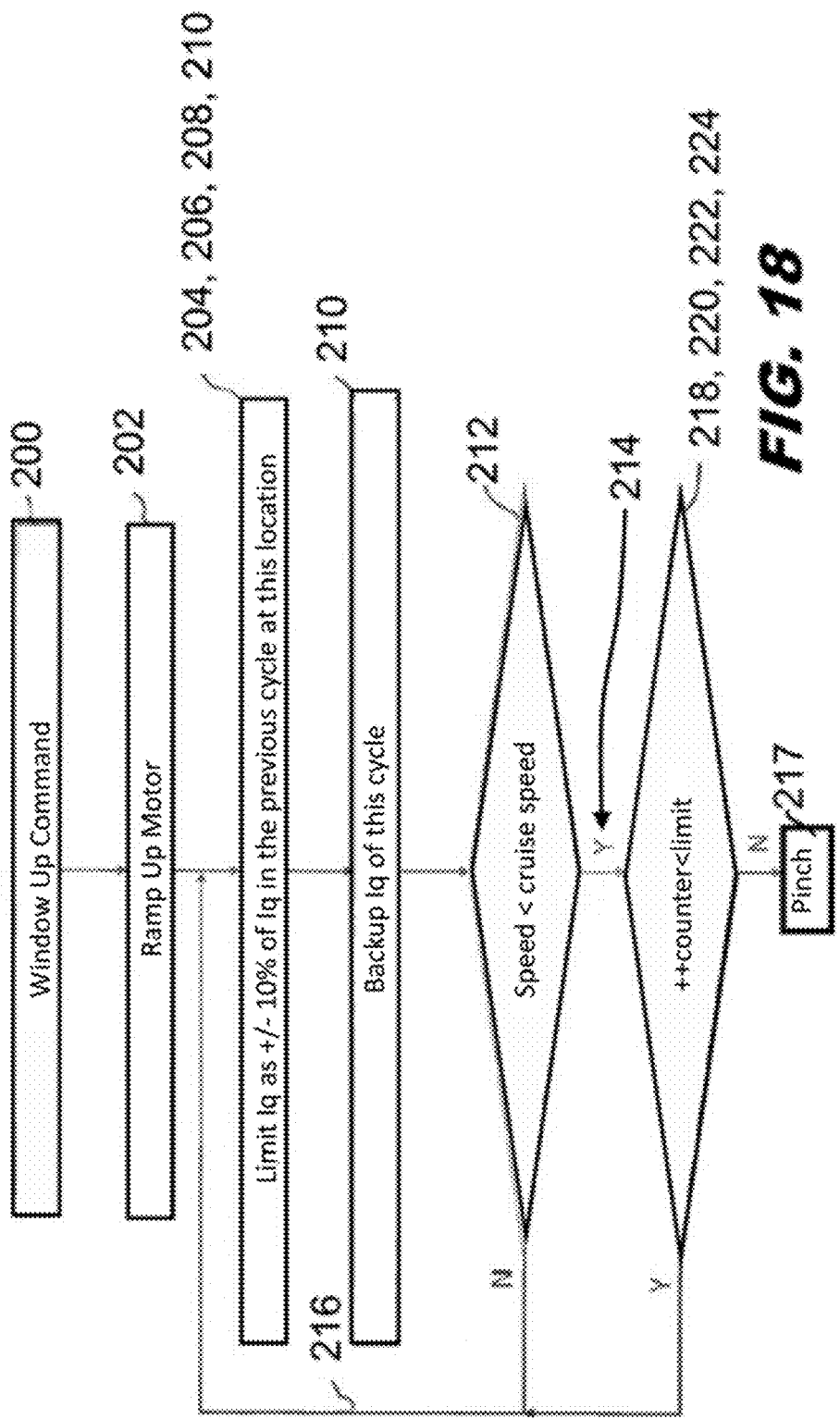
FIG. 18 illustrates steps of a method of controlling a brushless electric motor using a control system including a vector control system and a vector torque current limiter according to aspects of the disclosure.

As best shown in FIG. 18, a method of controlling the brushless electric motor 1 using the control system 30 including the vector control system 32 and the vector torque current limiter 54, shown in FIG. 16 is also provided. The method includes the steps of 200 determining that the brushless electric motor 1 has been commanded to move (e.g. receive a window up command) and 202 command operation of the brushless electric motor 1, for example ramping up the brushless electric motor 1, in response to determining that the brushless electric motor 1 has been commanded to move using the vector control system 32.

Next, the method proceeds by 204 determining the torque current drawn ($\vec{I}q$) using the vector torque current limiter 54 and 206 receiving the measured angular velocity of the brushless electric motor 1 using the vector torque current limiter 54. More specifically, the method can include the steps of 208 limiting the controlled torque current $\hat{I}q$ at a position (e.g. cycle) of the brushless electric motor 1 within a predetermined percentage (e.g., +/−10%) of a previous controlled torque current $\vec{I}q_{previous}$ corresponding to the position of the brushless electric motor 1 using the vector torque current limiter 54 and 210 backing up the controlled torque current drawn $\vec{I}q$, of this cycle for example, as the previous controlled torque current $\vec{I}q_{previous}$ using the vector torque current limiter 54.

The method can also include the step of 212 determining whether there is a reduction of the measured angular velocity ω relative to a predetermined speed limit, also referred to as a predetermined angular velocity, using the vector torque current limiter 54 (e.g. ω<speed limit, or speed<cruise speed). Then, the method can include the steps of 214 starting and incrementing a counter 177 in response to the measured angular velocity ω being less than the predetermined speed limit using the vector torque current limiter 54. Then, the step of 216 returning to the step of 210 limiting the controlled torque current $\hat{I}q_{controlled}$ at a position of the brushless electric motor 1 within the predetermined percentage of the previous controlled torque current $\vec{I}q_{previous}$ corresponding to the position of the brushless electric motor 1 in response to the measured angular velocity ω not being less than the predetermined speed limit.

Then, the method includes the steps of 218 detecting a pinch event of the closure panel (e.g., window 11) and 220 reducing the torque current $\hat{I}q$ in response to determining there is a reduction of the measured angular velocity ω of the brushless electric motor 1 relative to the predetermined speed limit using the vector torque current limiter 54. Specifically, the method can include 222 determining whether the counter 177 is less than the predetermined time period (e.g counter>time X?, or ++counter<limit) and 224 concluding there is a pinch event in response to determining that the counter 177 is not less than the predetermined time period and the measured angular velocity ω being less than the predetermined speed limit.

Figure 19:
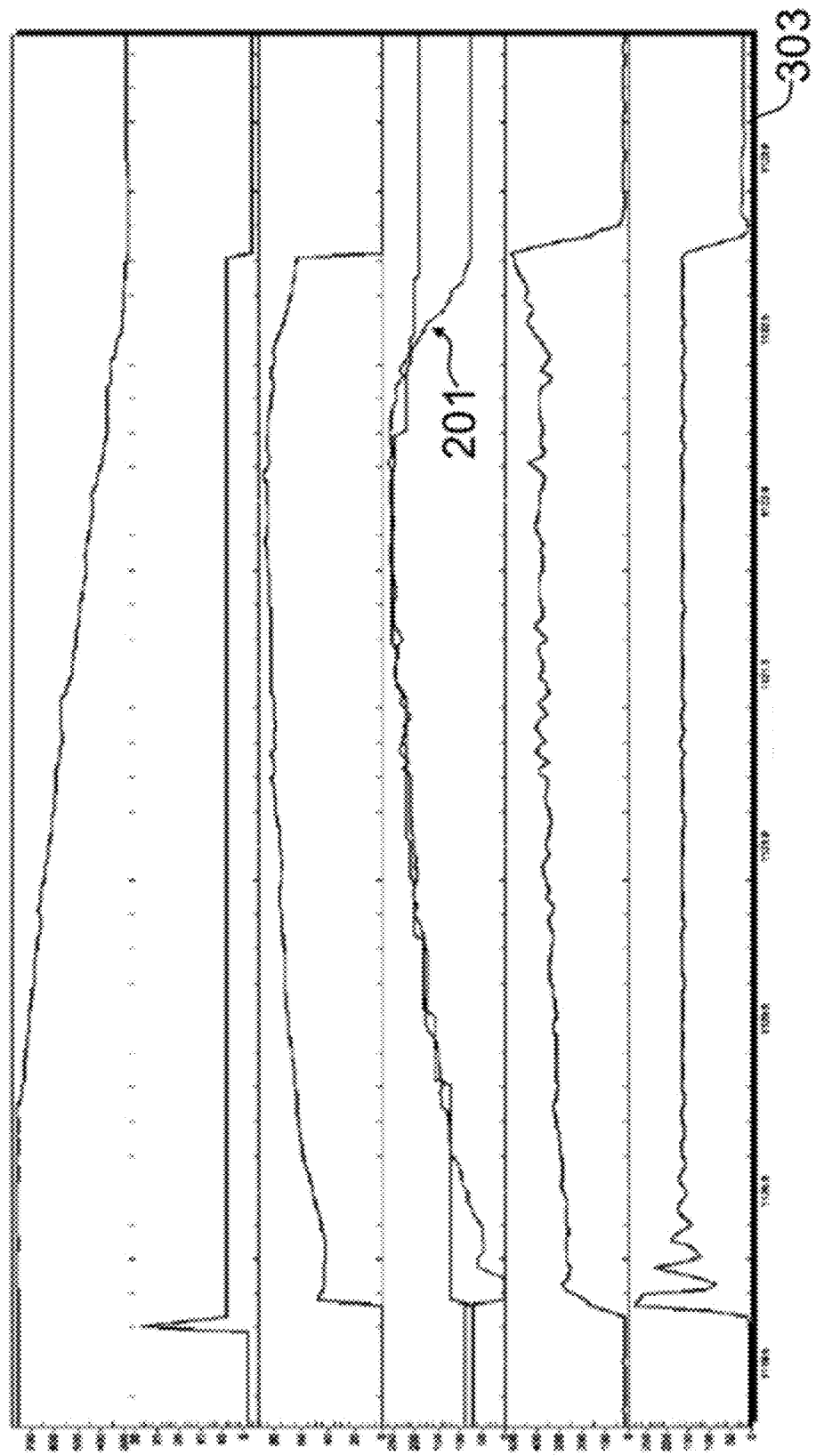
FIG. 19 is a plurality of graphs of readings of a brushed electric motor illustrating a slope of a speed decrease during a pinch event according to aspects of the disclosure.

FIG. 19 shows a plurality of graphs of readings of a brushed electric motor. As shown, a slope 301 of a speed decrease over time (Time axis 303) during a pinch event is indicated for the control system 30 as it is applied to a brushed electric motor (not shown) relative to other control system signals in adjacent graphs. When the control system 30 (algorithm) is applied to brushless electric motor 1, the slope 201 will be steeper. In other words, the brushless electric motor 1 will stop faster (e.g. providing an improved speed reducing response time during a possible pinch event) to avoid increasing pinch forces 18 on the object 59 during the pinch event.

Figure 22:
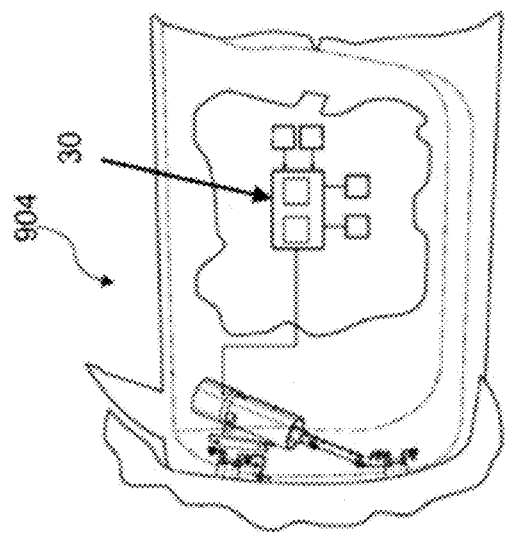
FIG. 22 illustrates a power operated side door of a vehicle employing obstacle detection that could use the control system of FIG. 16 according to aspects of the disclosure.
Figure 21:
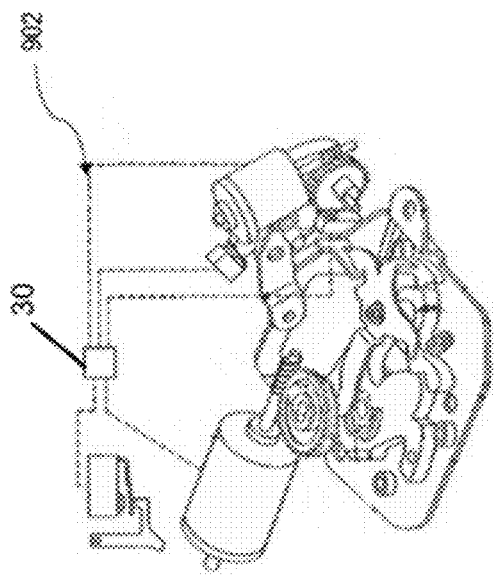
FIG. 21 illustrates components of a power operated mechanism that could be reduced in size due to the implementation of the control system of FIG. 16 according to aspects of the disclosure.
Figure 20:
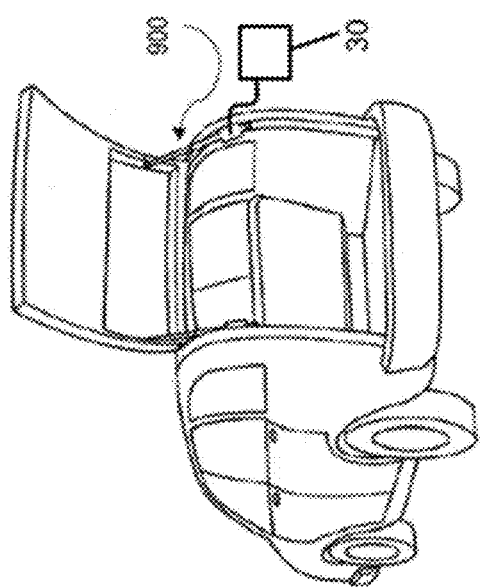
FIG. 20 shows a to a power lift gate system that could use the control system of FIG. 16 according to aspects of the disclosure.

Those skilled in the art will recognize that concepts disclosed in association with the example motor control system 30 can likewise be implemented into many other systems to control one or more operations and/or functions, such as, but not limited to the obstacle detection functionality of the motor of a spindle 900 for a power lift gate system for detecting obstacle/pinches during opening closing of the liftgate shown in FIG. 20, latch systems such as the reducing the component strengths of latch system 902 now subjected to less loading due to a precise torque control of the motor shown in FIG. 21, or a side door power actuator 904 of a vehicle employing obstacle detection as shown in FIG. 22.

As mentioned above, brushless motors, when compared to brushed motors, provide inherent advantages for anti-pinch functionality in window regulator design. For example, the inherent lower inertia (mass) of a brushless motor (e.g., brushless electric motor 1) can result in a motor that can stop rotation faster when controlled to do so, for example, when a pinch event is detected. This is important for meeting anti-pinch regulations.

Also, faster motor response times can allow for other benefits, such as the reduced overdesign of system components, such as the gears for latches. Overdesign in components is currently done in order for the component to withstand the maximum output torque of the motors, since present motor control typically results in the motor being imprecisely controlled to its maximum output, which may damage a component if under designed.

Using the combination of vector control for brushless motors can achieve improved obstacle detection/anti-pinch functionality, as well as benefits in more precise torque control of the motor which can result in better designed (lower strength system components). Advantageously such precise control can allow better control to meet anti-pinch regulations, result in more precise torque output control allowing for cheaper and less robust components to be designed (i.e. gears), as well as the possibility of using larger motors for smaller motor applications (since the torque output of the large motor can be more precisely controlled and managed equivalent to the max torque output of a smaller motor), resulting in costs saving when only one motor is be designed for multiple applications.

Therefore, the control system 30 and method disclosed herein provide numerous advantages. For example, FIG. 21 illustrates components of a power operated mechanism (e.g., latch system) that could be reduced in size due to the implementation of the control system 30 of FIG. 7. Use of control system 30 can lead to new ways that the vehicle can be controlled because the control system 30 is able to meet the stringent FMVSS118 S5 regulations. As discussed above, a vehicle system (e.g., BCM 89) in communication with a remote wireless device, such as FOB 79 for controlling operation of the window 11 with a window close button 81 provided on the FOB 79 for example that can be activated to close the window 11 when the user is "out of sight of the window". Under FMVSS118 S4 compliance, a system needs to have a line of sight. As another example, the vehicle system may have an automatic window closing after a period of time (e.g., if the driver walks away and forgets to close the window 11), the vehicle system will close them automatically or windshield rain sensors 53 detect rain and cause the vehicle system to close the window 11. Similarly, the dashboard light sensor 51 (for headlights) could detect darkness. If the user forgot to close the window 11, the vehicle system using control system 30 could close the window 11 at night automatically. However, if the dashboard light sensor 51 detects that it is too sunny, the window 11 could also close automatically, if desired (e.g., if the vehicle 1010 has tinted the windows and wants to cover up from the sun). Another possible implementation could include alarm detection of motion of the vehicle 1010 (e.g., from wind) and automatically close window 11 to keep debris from entering vehicle 1010. In summary, the control system 30 and disclosed method can enable vehicle systems to close the window 11, without the need for a user to supervise such closing operation, since the anti-pinch detection is sensitive enough to ensure that a child for example will not get injured if they engage with the closing window 11.

Figure 23:
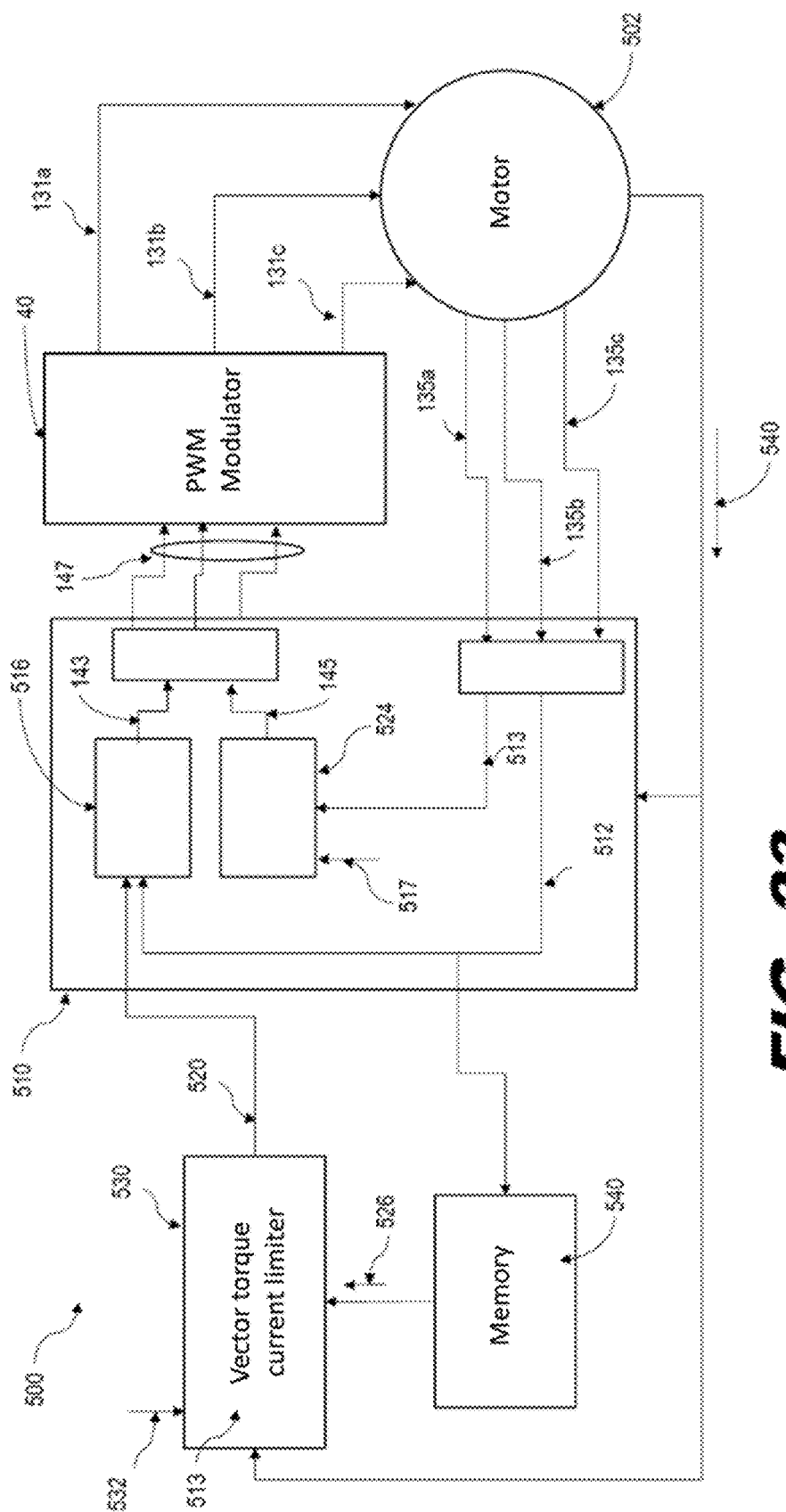
FIG. 23 is a block diagram of a control system for controlling a brushless electric motor of a vehicle system according to aspects of the disclosure.

Now referring to FIG. 23, in accordance with an illustrative embodiment, there is provided a brushless electric motor drive system 500 comprising an electric motor 502 including a rotor 3 and a stator 5. The stator 5 includes stator windings 2a, 2b, 2c configured to receive a three-phase voltage signal 131a, 131b, 131c to drive the rotation of the rotor 3 at an angular velocity ω, the rotation of the rotor 3 results from three-phase stator currents 135a, 135b, 135c in the stator windings 2a, 2b, 2c. The brushless electric motor drive system 500 also includes a pulse width modulated inverter 40 coupled to the electric motor 502 that is configured to generate the three-phase voltage signal 131a, 131b, 131c based on a three-phase switching vector signal 147. The brushless electric motor drive system 500 additionally includes a control system having a vector controller 510 coupled to the pulse width modulated inverter 40 and configured to generate the three phase switching signal 147 translated from a quadrature torque signal 143 and flux current signal 145, illustrated as vectors on the graph relative to the stator Y-axis as the Quadrature axis 197 and the stator x-axis as the Direct-Axis 195 The vector controller 510 is also configured to generate a two-phase stator vector signal comprising a stator torque current signal 512 and a stator flux current signal 513, represented as a single Is Stator Current Vector 199, translated from the generated three-phase stator currents 135a, 135b, 135c. The vector controller 510 includes a torque controller 516 designed to generate the quadrature torque signal 143 based on an adjusted quadrature current signal 520 and the stator torque current signal 512. The vector controller also includes a flux controller 524 designed to generate the flux current signal 145 based on the stator flux current signal 513 and a reference flux current signal 517. In addition the vector controller 510 includes a vector or quadrature torque current limiter 530 including a target command input 532 for receiving a rotation command signal. The vector controller 510 additionally includes a memory module 540 for storing the stator torque current signal 512. The quadrature torque current limiter 530 is configured to generate the adjusted quadrature current signal 520 based on the received rotation command signal 532, an actual rotor angular velocity signal 540, and the stored stator torque current signal component 512.

Figure 24:
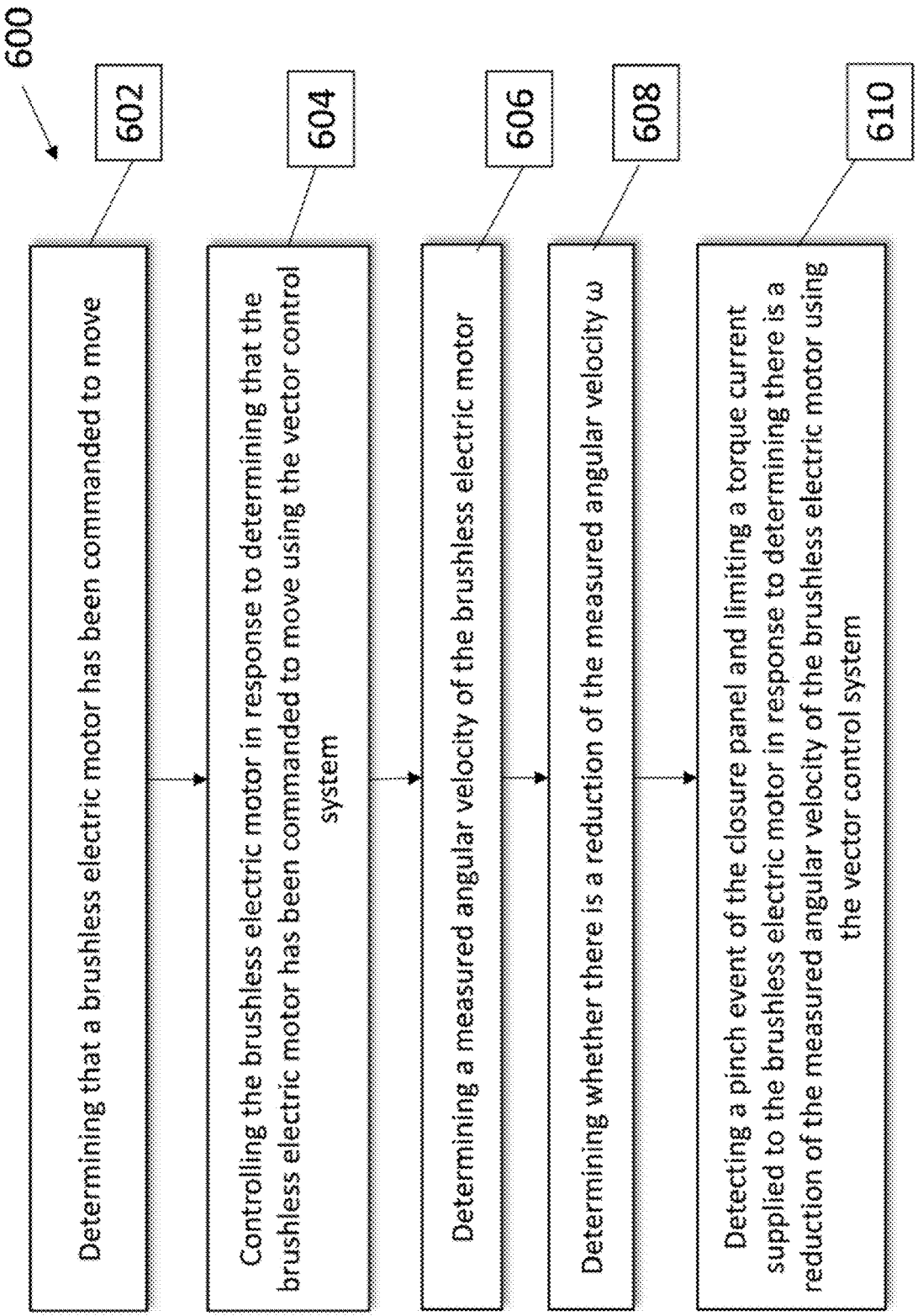
FIG. 24 is a flowchart illustrating an exemplary method for controlling the brushless motor of FIG. 6, in accordance with an illustrative embodiment.

Now referring to FIG. 24, there is illustrated a method of controlling a brushless electric motor using a control system including a vector control system for moving a closure panel 600, for example as performed by controller 100 (e.g. controller 100 may be configured to execute the illustrative steps) including the steps of determining that the brushless electric motor has been commanded to move 602, controlling the brushless electric motor in response to determining that the brushless electric motor has been commanded to move using the vector control system 604, determining a measured angular velocity of the brushless electric motor 606, determining whether there is a reduction of the measured angular velocity ω 608, and detecting a pinch event of the closure panel and limiting a torque current supplied to the brushless electric motor in response to determining there is a reduction of the measured angular velocity of the brushless electric motor using the vector control system 610.

The method 600 may further include the step of limiting the torque current comprises limiting the controlled torque current at a position of the brushless electric motor within a predetermined percentage of a previous controlled torque current corresponding to the position of the brushless electric motor. The method 600 may further include the steps of determining the measured angular velocity being less than a predetermined speed limit, and returning to the step of limiting the controlled torque current in response to the measured angular velocity not being less than the predetermined speed limit, determining whether a predetermined time period after determining the measured angular velocity being less than a predetermined speed limit has expired, and concluding there is a pinch event in response to determining that the predetermined time period has expired and the measured angular velocity being less than the predetermined speed limit. The method 600 may further include the step of determining that the brushless electric motor has been commanded to move comprises receiving a command from a remote device.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A power-operated closure system for use in a motor vehicle to move a closure member between an open position and a closed position, comprising:
   a powered operated actuator coupled to the closure member and operable for moving the closure member between the open and closed positions, the powered actuator including a brushless DC (BLDC) electric motor; and
   a controller configured to control the brushless DC (BLDC) electric motor using a field oriented control (FOC) method, wherein the field oriented control (FOC) method includes controlling a torque current supplied to the brushless DC (BLDC) electric motor, the controller further configured to:
   detect an angular velocity ω of the brushless DC (BLDC) electric motor,
   limit the torque current supplied to the brushless DC (BLDC) electric motor in response to determining a reduction of the angular velocity ω of the brushless DC (BLDC) electric motor, and limit the controlled torque current at a position of the brushless DC (BLDC) electric motor within a predetermined percentage of a previous controlled torque current corresponding to the position of the brushless electric motor.

2. A power-operated closure system for use in a motor vehicle to move a closure member between an open position and a closed position, comprising:
a powered operated actuator coupled to the closure member and operable for moving the closure member between the open and closed positions, the powered actuator including a brushless DC (BLDC) electric motor; and
a controller configured to control the brushless DC (BLDC) electric motor using a field oriented control (FOC) method, wherein the field oriented control (FOC) method includes controlling a torque current supplied to the brushless DC (BLDC) electric motor, the controller further configured to:
detect an angular velocity $\omega$ of the brushless DC (BLDC) electric motor,
limit the torque current supplied to the brushless DC (BLDC) electric motor in response to determining a reduction of the angular velocity $\omega$ of the brushless DC (BLDC) electric motor, and
limit the controlled torque current in response to determining the reduction of a measured angular velocity $\omega$ of the brushless DC (BLDC) electric motor is below a predetermined angular velocity.

3. The power-operated closure system of claim 2, wherein the controller is further configured to conclude there is a pinch event in response to determining that a predetermined time period has expired subsequent to determining the reduction of the measured angular velocity $\omega$ of the brushless DC (BLDC) electric motor is below the predetermined angular velocity.

4. The power-operated closure system of claim 2, wherein the controller in response to concluding there is a pinch event is further configured to reduce the angular velocity $\omega$ of the brushless DC (BLDC) electric motor to zero and to eliminate a flux current in the brushless DC (BLDC) electric motor and subsequently reverse the angular velocity $\omega$ of the brushless DC (BLDC) electric motor to move the closure member in an opposite direction.

5. A power-operated closure system for use in a motor vehicle to move a closure member between an open position and a closed position, comprising:
a powered operated actuator coupled to the closure member and operable for moving the closure member between the open and closed positions, the powered actuator including a brushless DC (BLDC) electric motor; and
a controller configured to control the brushless DC (BLDC) electric motor using a field oriented control (FOC) method, wherein the field oriented control (FOC) method includes controlling a torque current supplied to the brushless DC (BLDC) electric motor, the controller further configured to:
detect an angular velocity $\omega$ of the brushless DC (BLDC) electric motor,
limit the torque current supplied to the brushless DC (BLDC) electric motor in response to determining a reduction of the angular velocity $\omega$ of the brushless DC (BLDC) electric motor, and
incrementally limit the torque current supplied to the brushless DC (BLDC) electric motor as a function of the torque current supplied to the brushless DC (BLDC) electric motor in a previous cycle.

6. A power-operated closure system for use in a motor vehicle to move a window between an open position and a closed position, comprising:
a powered operated actuator coupled to the window and operable for moving the window between the open and closed positions, the powered actuator including a brushless DC (BLDC) electric motor;
a controller configured to control the brushless DC (BLDC) electric motor using a field oriented control (FOC) method; and
a wireless device comprising an input configured to receive a command from a user to move the window to the closed position and wirelessly transmit the command, the controller further configured to receive the wirelessly transmitted command and in response control the brushless DC (BLDC) electric motor to move the window from the open position to the closed position.

7. The power-operated closure system of claim 6, wherein the wireless device is a key FOB and the input is a button provided on the key FOB, and the command from the user is a discontinuous interaction with the button.

8. The power-operated closure system of claim 6, wherein the controller is configured to control the brushless DC (BLDC) electric motor to move the window from the open position to the closed position when the input of the wireless device receives the command from the user and user is not within a line of sight with the window.

9. A power-operated closure system for use in a motor vehicle to move a window between an open position and a closed position, comprising:
a powered operated actuator coupled to the window and operable for moving the window between the open and closed positions, the powered actuator including a brushless DC (BLDC) electric motor;
a controller configured to control the brushless DC (BLDC) electric motor using a field oriented control (FOC) method; and
a Body Control Module (BCM) in communication with the controller, the controller further configured to receive a command from the Body Control Module and operate the brushless DC (BLDC) electric motor to move the window from the open position to the closed position, wherein the command from the Body Control Module is generated without an input received by the Body Control Module from a user to move the window.

10. The power-operated closure system of claim 9, further comprising a sensor in communication with the Body Control Module and configured to sense a condition of an environment surrounding the window, the Body Control Module configured to generate the command in response to sensing the condition of the environment.

11. A method of controlling a brushless DC (BLDC) electric motor using a control system including a vector control system for moving a closure panel, comprising the steps of:
determining that the brushless electric motor has been commanded to move;
controlling the brushless electric motor in response to determining that the brushless electric motor has been commanded to move using the vector control system;
determining a measured angular velocity of the brushless electric motor;
determining whether there is a reduction of the measured angular velocity $\omega$; and detecting a pinch event of the closure panel and limiting a torque current supplied to the brushless electric motor in response to determining there is a reduction of the measured angular velocity of the brushless electric motor using the vector control system.

12. The method as set forth in claim 11, wherein the step of limiting the torque current comprises limiting the torque current at a position of the brushless electric motor within a predetermined percentage of a previous controlled torque current corresponding to the position of the brushless electric motor.

13. The method as set forth in claim 11, further including the steps of:
   determining the measured angular velocity being less than a predetermined speed limit;
   returning to the step of limiting the controlled torque current in response to the measured angular velocity not being less than the predetermined speed limit;
   determining whether a predetermined time period after determining the measured angular velocity being less than a predetermined speed limit has expired; and
   concluding there is a pinch event in response to determining that the predetermined time period has expired and the measured angular velocity being less than the predetermined speed limit.

14. The method as set forth in claim 13, wherein the step of determining that the brushless electric motor has been commanded to move comprises receiving a command from a remote device.

15. The method as set forth in claim 11, wherein the closure panel is a window of a motor vehicle.

16. The method as set forth in claim 11, further comprising the step of eliminating a flux current in the brushless DC (BLDC) electric motor during limiting the torque current supplied to the brushless electric motor.

17. A control system for controlling a brushless electric motor of a power operated actuator of a closure panel of a vehicle, comprising:
   a vector control system; and
   a vector torque current limiter coupled to said vector control system and the brushless electric motor and configured to:
      determine a torque current drawn by the brushless electric motor,
      receive a measured angular velocity of the brushless electric motor,
      determine whether there is a reduction of the measured angular velocity relative to a predetermined speed limit, and
      detect a pinch event of the closure panel and limit a torque current supplied to the brushless electric motor in response to determining there is a reduction of the measured angular velocity w of the brushless electric motor.

* * * * *